United States Patent
Houston et al.

(10) Patent No.: US 9,614,784 B1
(45) Date of Patent: Apr. 4, 2017

(54) SYSTEMS AND METHODS FOR ASSIGNING TASKS BASED ON USAGE PATTERNS AND RESOURCE CAPACITIES

(71) Applicants: Michael Houston, Parkland, FL (US); Gabriel Perez, Fort Lauderdale, FL (US)

(72) Inventors: Michael Houston, Parkland, FL (US); Gabriel Perez, Fort Lauderdale, FL (US)

(73) Assignee: HCA Holding, Inc., Nashville, TN (US)

(*) Notice: Subject to any disclaimer, the term of this patent is extended or adjusted under 35 U.S.C. 154(b) by 0 days.

(21) Appl. No.: 14/862,819

(22) Filed: Sep. 23, 2015

Related U.S. Application Data

(60) Provisional application No. 62/054,516, filed on Sep. 24, 2014, provisional application No. 62/222,432, filed on Sep. 23, 2015.

(51) Int. Cl.

| | |
|---|---|
| *G06F 9/50* | (2006.01) |
| *H04L 12/911* | (2013.01) |
| *H04L 12/26* | (2006.01) |
| *H04L 29/08* | (2006.01) |
| *G06F 9/48* | (2006.01) |
| *G06Q 10/06* | (2012.01) |

(52) U.S. Cl.
CPC ............ *H04L 47/822* (2013.01); *H04L 43/12* (2013.01); *H04L 47/821* (2013.01); *H04L 47/823* (2013.01); *H04L 67/1002* (2013.01); *G06F 9/4887* (2013.01); *G06F 9/50* (2013.01); *G06F 9/5055* (2013.01); *G06Q 10/06* (2013.01)

(58) Field of Classification Search
CPC ............ G06Q 10/06; G06Q 10/06311; G06Q 10/063114; G06F 19/327; G06F 9/5055; G06F 9/4887
See application file for complete search history.

(56) References Cited

U.S. PATENT DOCUMENTS

| | | | | |
|---|---|---|---|---|
| 7,249,179 B1* | 7/2007 | Romero | ................ | G06F 9/5083 709/221 |
| 2003/0130820 A1* | 7/2003 | Lane, III | ................ | G06Q 10/06 702/184 |
| 2004/0098447 A1* | 5/2004 | Verbeke | ................ | G06F 9/5055 709/201 |

(Continued)

*Primary Examiner* — Barbara Burgess
(74) *Attorney, Agent, or Firm* — Kilpatrick Townsend & Stockton LLP

(57) ABSTRACT

Techniques relate to facilitating assignments of tasks to promote efficient resource timetables. A first communication from a client device is received that corresponds to an electronic request to sue a resource to complete a task. A task type of the task and a client corresponding to the electronic request are identified. Usage data corresponding to the task type and client are identified. A task-assignment duration is defined based on the usage data and a buffer time period. An availability in a timetable of a resource that is of a duration that is at least as long as the task-assignment duration is identified. A second communication identifying a start time of the availability is transmitted to the client device. A third communication is received that accepts the start time, and a fourth communication is transmitted to a device controlling use of the resource that identifies the client, task and availability.

18 Claims, 11 Drawing Sheets

(56) References Cited

U.S. PATENT DOCUMENTS

| | | | |
|---|---|---|---|
| 2007/0011683 A1* | 1/2007 | Helander | G06F 9/4887 718/104 |
| 2007/0288290 A1* | 12/2007 | Motoyama | G06Q 10/06 705/7.13 |
| 2011/0320230 A1* | 12/2011 | Podgurny | G06Q 10/06 705/7.13 |
| 2014/0122143 A1* | 5/2014 | Fletcher | G06Q 10/06311 705/7.14 |

* cited by examiner

SYSTEMS AND METHODS FOR ASSIGNING TASKS BASED ON USAGE PATTERNS AND RESOURCE CAPACITIES

CROSS-REFERENCE TO RELATED APPLICATIONS

This application claims the benefit of and priority to U.S. Provisional Application Nos. 62/054,516, filed on Sep. 24, 2014 and 62/222,432, filed on Sep. 23, 2015. Each of these applications is hereby incorporated by reference in its entirety for all purposes.

FIELD

This disclosure relates to facilitating a series of electronic communications to identify a resource with specifications and an availability corresponding to parameters of a request.

BACKGROUND

Performance of various tasks frequently requires use of specialized resources. Quantities and capacities of resources may be limited, however, which may limit an extent to which resources may be available for a task at a requested time. Such limitations may result in an iterative communication exchange between a requesting device and resource devices to identify a responsive resource device associated with a resource load and configuration enabling handling of a task. Generating efficient resource-assignment can promote overall resource access and task performance.

SUMMARY

In some embodiments, a system is provided for facilitating assignments of tasks to resources in particular time intervals based on usage patterns and resource capacities. One or more interfaces receive electronic communications from one or more monitoring devices, receive electronic communications from one or more resource-controlling devices, transmit electronic communications to one or more resource-controlling devices, receive electronic communications from one or more client devices; and transmit electronic communications to one or more client devices. A resource-controlling device, monitoring device and/or client device may include one or more processors, one or more memories and one or more interfaces for communicating with other devices and/or receiving input.

A usage monitor monitors electronic communications, received via the one or more interfaces, from monitoring devices to identify resource-usage durations; and updates a usage-patterns data store to associate each of one or more entities and each of one or more task types with usage data based on one or more of the identified resource-usage durations. A timetable mirror monitors electronic communications, received via the one or more interfaces, from resource controlling devices to identify updates to timetables of the resources that indicate capacities to accept new tasks during particular time periods; and updates a mirrored timetable data store based on the identified updates to the timetables.

One or more load-balancing processors detect a first electronic communication, received via the one or more interfaces from a client device, that corresponds to an electronic request to use a resource to complete a task, identify a task type of the task, and identify a client that corresponds to the electronic request. The one or more load-balancing processors further access usage data, from the usage-patterns data store, associated with the client and the task type; identify, based on the usage data, a task-performance duration that corresponds to the electronic request for using the resource; and define a task-assignment duration based on the task-performance duration and a buffer time period. The one or more load-balancing processors further access, for each of one or more resources and from the mirrored timetable data store, a timetable of the resource that indicates a capacity to accept new tasks during particular time periods; identify an availability in the timetable of a resource of the one or more resources that is of a duration that is at least as long as the task-assignment duration; and generate a second electronic communication to be transmitted via the one or more interfaces to the client device that identifies a start time of the availability. The one or more load-balancing processors further yet detect a third communication received via the one or more interfaces from the client device that accepts the start time; and generate a fourth electronic communication to be transmitted via the one or more interfaces to a device controlling use of the resource that identifies the client, the task and the availability.

In various embodiments, each of one, more or all of the usage monitor, timetable mirror and one or more load-balancing processors can include a processor, set of processors, server, server farm, device and/or system. Two or more of the usage monitor, timetable mirror and one or more load-balancing processors may be co-located or geographically separated. In some instances, each of one, more or all of the usage monitor, timetable mirror and one or more load-balancing processors may be located in a facility. In some instances, each of one, more or all of the usage monitor, timetable mirror and one or more load-balancing processors may be in the cloud.

In some embodiments, a computer-implemented method is provided for facilitating assignments of tasks to resources in particular time intervals based on usage patterns and resource capacities. A first electronic communication is received from a client device that corresponds to an electronic request to use a resource to complete a task. A task type of the task and a client that corresponds to the electronic request are identified. Usage data based on previous resource-usage durations during which at least one resource was used to complete previous tasks of the task type is accessed. Each of the previous tasks is one associated with the client. Based on the usage data, a task-performance duration is identified that corresponds to the electronic request for using the resource. A task-assignment duration is defined based on the task-performance duration and a buffer time period. For each of one or more resources, a timetable of the resource is accessed that indicates a capacity to accept new tasks during particular time periods. An availability in the timetable of a resource of the one or more resources is identified that is of a duration that is at least as long as the task-assignment duration. A second electronic communication is transmitted to the client device that identifies a start time of the availability. A third electronic communication is received from the client device that accepts the start time. A fourth electronic communication is transmitted to a device controlling use of the resource that identifies the client, the task and the availability.

Further areas of applicability of the present disclosure will become apparent from the detailed description provided hereinafter. It should be understood that the detailed description and specific examples, while indicating various embodi-

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1A:
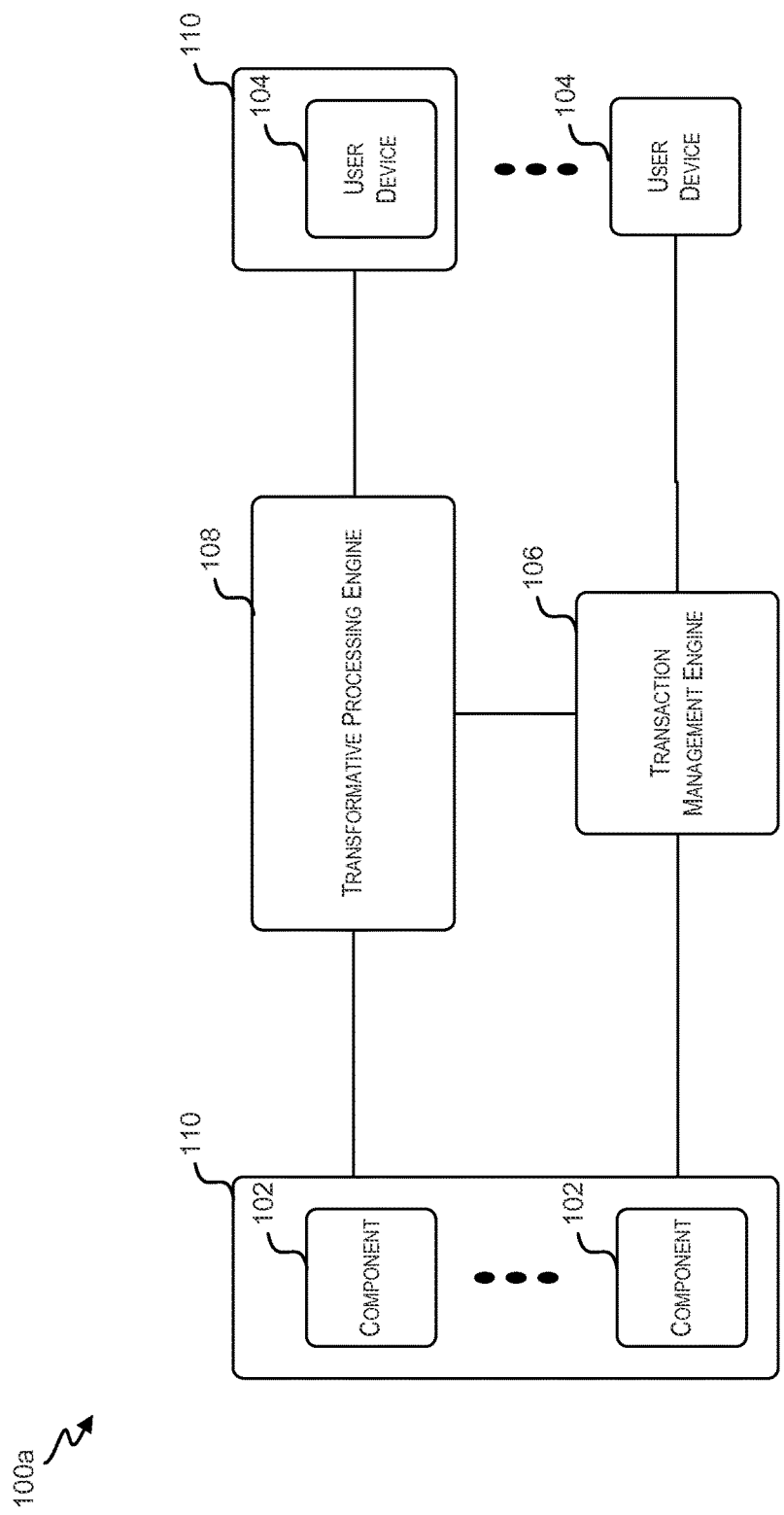
FIGS. 1A and 1B show block diagrams of embodiments of an interaction systems.

Referring first to FIG. 1A, a block diagram of an embodiment of an interaction system 100 is illustrated. Generally, in interaction system 100a, data can be generated at one or more system components 102 and/or user devices 104. Transaction management engine 106 can manage the flow of communications within interaction system. Transformative processing engine 108 can receive, intercept, track, integrate, process and/or store such data.

Referring first to FIG. 1A, a block diagram of an embodiment of an interaction system 100a is illustrated. Generally, in interaction system 100a, data can be generated at one or more system components 102 and/or user devices 104. Transaction management engine 106 can manage the flow of communications within interaction system. Transformative processing engine 108 can receive, intercept, track, integrate, process and/or store such data.

Data flowing in interaction system 100a can include a set of communications. Each of one, some of all communications can include (for example) an encoding type, authentication credential, indication of a content size, identifier of a source device, identifier of a destination device, identifier pertaining to content in the communication (e.g., an identifier of an entity), a processing or reporting instruction, a procedure specification, transmission time stamp, and/or sensor measurement. Data may, or may not, selectively pertain to a particular entity and/or client. Data can, depending on the implementation, include individually identifiable information and/or de-identified information as it pertains to an entity and/or client. Data may, but need not, include protected information.

For example, a system component 102 can include, for example, a sensor to detect a sensor measurement and can thereafter generate and transmit a communication that reflects the sensor measurement. The communication may be transmitted at routine times and/or upon detecting a threshold (e.g., one or more) number of measurements or a measurement satisfying a transmission condition (e.g., exceeding a threshold value). In some instances, the sensor measurement corresponds to one reflecting a property of an object or entity (e.g., person) near the sensor. The communication may then include an identifier of the object or entity. The identifier can be determined, for example, based on detection of a nearby electronic tag (e.g., RFID tag), a detected user input received at a user interface of component 102 and/or data in a corresponding communication received from a user device.

As another example, a user device 104 can be configured to detect user input received at a user interface of the device. The user input can include, for example, an identifier of an object or entity, an instruction, a characterization of an object or entity, an identification of an assessment to be performed, a specification of an aggregation or data processing to be performed, and/or an identification of a destination for a data-analysis report. User device 104 can further be configured to detect user input requesting particular data, to generate a request communication (e.g., to be sent to transformative processing engine), to receive the requested data and/or to present the received data.

Data can include information that identifies a person, such as personal information and/or demographic information. For example, the information can identify a person's name, age, sex, race, physical address, phone number, email address and/or social security number. Data may include information collected by a government agent, employer, insurer, or school or university, that relates to a past, present, or future condition or status (e.g., pertaining to employment, political involvement, occupation, health, or financial status) of any individual. For example, data may include information about past events.

Data may identify an entity being evaluated and/or one at least partly performing an evaluation. For example, a communication may identify a first company as one being evaluated and a second company as one evaluating a quality of a product of the first company. As another example, a communication may identify a first service plan of a first company as one providing an Internet network and may identify one or more users providing speed checks over the network.

The depicted engines, devices and/or components can communicate over one or more networks. A network of one or more networks can include a wired network (e.g., fiber, ethernet, powerline ethernet, ethernet over coaxial cable, digital signal line (DSL), or the like), wireless network (e.g., Zigbee™, Bluetooth™, WiFi™, IR, UWB, WiFi-Direct, BLE, cellular, Long-Term Evolution (LTE), WiMax™, or the like), local area network, the Internet and/or a combination thereof. It will be appreciated that, while one or more components 102 and one or more user devices 104 are illustrated as communicating via transformative processing engine 108 and/or transaction management engine 106, this specification is not so limited. For example, each of one or more components 102 may communicate with each of one or more user devices 104 directly via other or the same communication networks.

A component 102 can be configured to detect, process and/or receive data, such as environmental data, geophysical data, biometric data, chemical data (e.g., chemical composition or concentration analysis data), and/or network data. The data can be based on data detected, for example, via a sensor, received signal or user input. A user device 104 can include a device configured to receive data from a user and/or present data to a user. It will be appreciated that, in some instances, a component 102 is also a user device 104 and vice-versa. For example, a single device can be configured to detect sensor measurements, receive user input and present output.

A component 102 can be configured to generate a communication that is in one or more formats, some of which can be proprietary. For example, an imaging machine (e.g., one of one or more components 102) manufactured by company A, located within a first facility (e.g., facility 110), and belonging to a first client, may save and transfer data in a first format. An imaging machine (e.g., one of one or more components 102) manufactured by company B, located within the first facility (e.g., facility 110), and belonging to the first client, may save and transfer data in a second format. In some examples, data from certain components is transformed, translated, or otherwise adjusted to be recognizable by transformative processing engine 108. Thus, continuing with the example from above, when the imaging machines manufactured by companies A and B are located within the first facility belonging to the first client, they may nevertheless save and transfer data in different formats. In some examples, one or more components 102 communicate using a defined format.

In some examples, each of one or more components 102 are each associated with one or more clients within a same or different interaction systems. For example, certain ones of one or more components 102 may be associated with a first client, while other ones of one or more components 102 may be associated with a second client. Additionally, each of one or more components 102 may be associated with a facility 110 (e.g., client facility). Each facility 110 may correspond to a single location and/or processing focus. Exemplary types of facilities include server farm facilities, web-server facilities, data-storage facilities, technical-support facilities, telecommunication facilities, care facilities and/or business operation facilities. For example, a first facility may include a structure at a first location at which one or more resources (e.g., computational resources, equipment resources, laboratory resources and/or human resources) are provided. Each of the one or more resources may be of a first type in a first set of types. A resource type can be identified based on, for example, a characteristic of the resource (e.g., sensor inclusion) and/or a capability of providing each of one or more services. Thus, for example, resources at a first facility may be better configured for handling a particular type of service requests compared to those in another facility. As another examples, different facilities may include resources of similar or same types but may vary in terms of, for example, user accessibility, location, managing client, etc.

Transmission of data from one or more components 102 to transformative processing engine 108 may be triggered by a variety of different events. For example, the data may be transmitted periodically, upon detection of an event (e.g., completion of an analysis or end of a procedure), upon detection of an event defined by a rule (e.g., a user-defined rule), upon receiving user input triggering the transmission, or upon receiving a data request from transformative processing engine 108. Each transmission can include, e.g., a single record pertaining to a single entity, object, procedure, or analysis or multiple records pertaining to multiple entities, objects, procedures, or analyses.

In some examples, at least some of one or more user devices 104 are associated with facility 110. In some examples, at least some of one or more user devices 104 need not be associated with facility 110 or any other facility. Similar to one or more components 102, one or more user devices 104 may be capable of receiving, generating, processing and/or transmitting data. Examples of one or more user devices 104 include, for example, a computer, a mobile device, a smart phone, a laptop, an electronic badge, a set-top box, a thin client device, a tablet, a pager, and other similar user devices). One or more user devices 104 may be configured to run one or more applications developed for interacting with data collected by transformative processing engine 108. For example, those user devices of one or more user devices 104 that are not associated with facility 110 may be configured to run one or more third-party applications that may rely in part on the data gathered by transformative processing engine 108.

Each of one or more components 102 and one or more user devices 104 may be utilized by one or more users (not shown). Each of the one or more users may be associated with one or more clients. For example, one of the one or more users can be associated with a client as a result of being employed by the client, physically located at a location of the client, being an agent of the client or receiving a service from the client.

In some examples, one or more components 102 and one or more user devices 104 may communicate with transformative processing engine 108 and transaction management engine 106 via different information formats, different proprietary protocols, different encryption techniques, different languages, different machine languages, and the like. As will be discussed with reference to FIG. 2, transformative processing engine 108 is configured to receive these many different communications from one or more components 102, and in some examples from one or more user devices 104, in their native formats and transform them into any of one or more formats. The received and/or transformed communications can be transmitted to one or more other devices (e.g., transaction management engine 106, an entity device and/or a user device) and/or locally or remotely stored. In some examples, transformative processing engine 108 receives data in a particular format (e.g., the HL7 format) or conforming to any other suitable format and/or is configured to transform received data to conform with the particular format.

One or more components 102 of facility 110 can include and/or has access to a local or remote memory for storing generated data. In some examples, the data is stored by one or more servers local to facility 110. Such storage may enable facility 110 to retain locally data pertaining to its facility prior to (or in conjunction with) the data being shared with transformative processing engine 108 and/or transaction management engine 106. In some examples, the one or more servers of facility 110 share data directly with a record service (not shown), and the record service makes the data available to transformative processing engine 108 and/or transaction management engine 106. Once an electronic record is updated at facility 110, an indication of the update may be provide to the record service. The record service may then update a corresponding record associated with the electronic record.

The record service can be granted access to the data generated and/or transmitted by one or more components 102. In some examples, the record service includes a server or a plurality of servers arranged in a cluster or the like. These server(s) of the record service can process and/or store data generated by one or more components 102. For example, one or more records can be generated for each entity (e.g., each record corresponding to a different entity or being shared across entities). Upon receiving a communication with data from an component (or facility), the record service can identify a corresponding record and update the record to include the data (or processed version thereof). In some examples, the record service provides data to transformative processing engine 108.

Facility 110 can include one at which a resource is located and/or service is provided. Irrespective of the type of facility, facility 110 may update data, maintain data, and communicate data to transformative processing engine 108. At least some of the data may be stored local to facility 110.

A user interacting with a user device 104 can include, for example, a client customer, client agent and/or a third party. A user may interact with user device 104 and/or component 102 so as to, for example, facilitate or initiate data collection (e.g., by a component 102), provide data, initiate transmission of a data request, access data and/or initiate transmission of a data-processing or data-storage instruction. In some instances, one or more user devices 104 may operate according to a private and/or proprietary network or protocols. In other examples, one or more user devices 104 may operate on public networks. In any case, however, transformative processing engine 108 can have access to the one or more components and can communicate with them via a public, private and/or proprietary network or protocols. The use of one or more private and/or proprietary protocols can promote secure transfer of data.

Figure 1B:
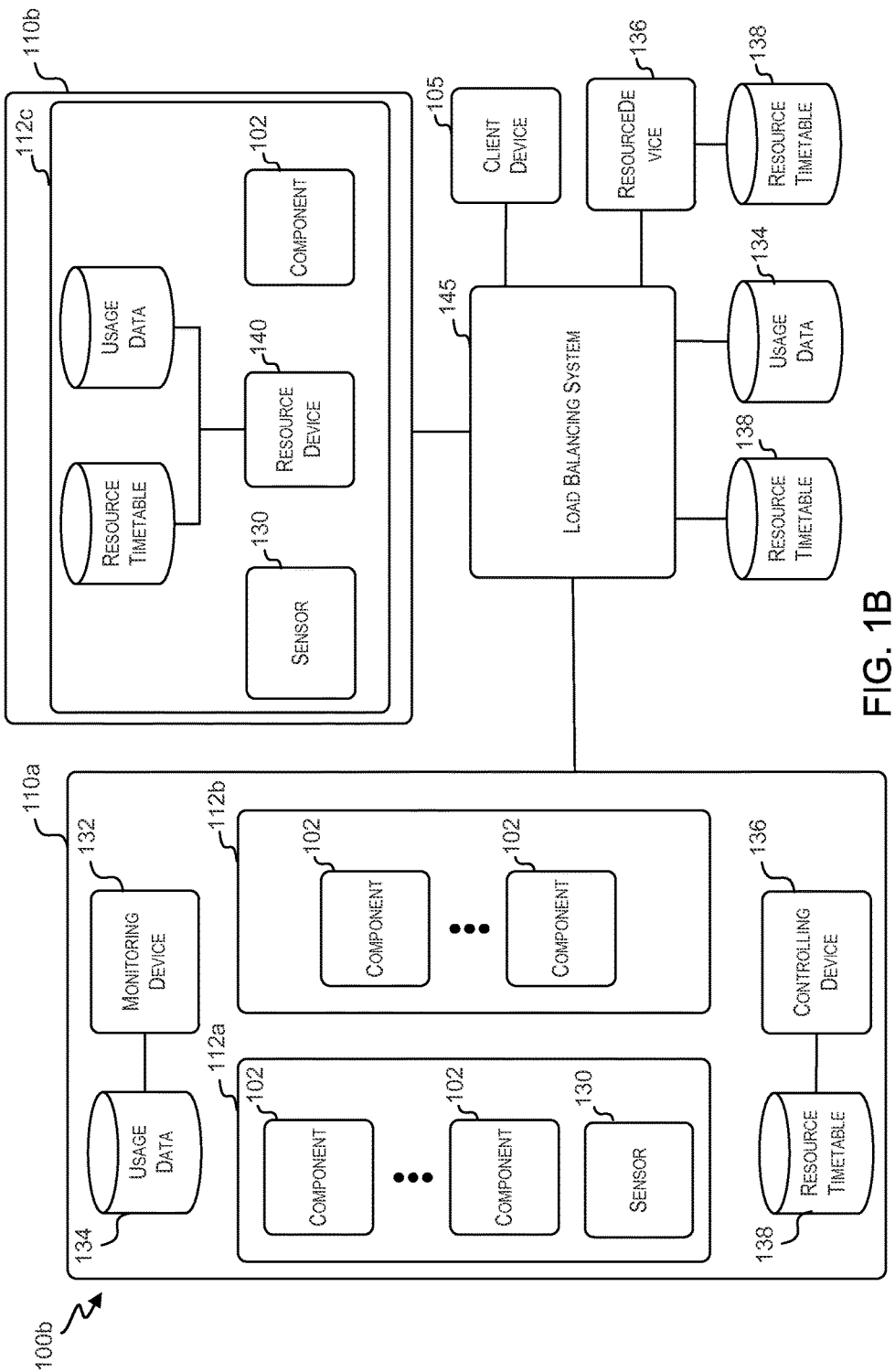

Referring next to FIG. 1B, a block diagram of an embodiment of an interaction system 100*b* is illustrated. The depicted instance shows two facilities 110*a*, 110*b*. In one instance, each of facilities 110*a*, 110*b* corresponds to or includes one or more buildings. Each facility 110 can include one or more units 112. In the depicted instance, a first facility 110*a* includes two units 112*a* and 112*b*, and a second facility 110*b* includes one unit 112*c*.

Each unit 112 may correspond to a particular space (e.g., as defined by geographic coordinates, altitude, a floor, a room number, etc.) Units within a given facility (e.g., 112*a* and 112*b*) may be geographically separated from each other, such as being within or being different rooms. In one instance, each of at least some units 112 within a facility may be of a same or similar type; may be configured for a same or similar type of use and/or may have one or more same or similar specifications or characteristics (e.g., dimensions, sizes, or intra-unit components). In one instance, each of at least some units 112 within a facility may be of different types, may be configured for different types of use and/or may have one or more different specifications or characteristics.

Within each unit may be one or more components 102 and/or one or more sensors 130. In various embodiments, a given component 102 and/or sensor 130 may, or may not, be fixed in place (i.e., stationary), restrained to limit mobility or fully movable. A component 102 may be configured to be used by an operator or user.

A sensor 130 may include, for example, a sensor configured to monitor a characteristic of an ambient environment (e.g., motion, light, temperature or humidity). In one instance, a sensor 130 is a sensor coupled to a component 102. For example, a sensor 130 may be configured to detect whether an added weight has been placed on part of a component. As another example, a sensor 130 may be included within a badge reader component so as to detect badge-related signals (e.g., an image or RFID signal). As yet another example, a sensor 130 may be included within an equipment-tracking component so as to detect equipment tags. As still another example, a sensor 130 may include a receiver to receive signals from one or more signal sources (e.g., GPS satellites or WiFi access points) to enable identifying a location of a device coupled to or including the sensor.

A component 102 and/or sensor 130 may be configured to transmit electronic communications to one or more other electronic devices. The electronic communications may be transmitted, for example, upon detecting a new type of signal (e.g., detecting a presence of a new device); at regular times or intervals; upon receiving a request; and/or upon detecting that a transmission condition has been satisfied. The electronic communication may be transmitted to a device that is near or remote from the component and/or sensor. The electronic communication may include (for example) sensor-collected data, inputs received at a component, an indication that an event has been detected, an indication that a transmission condition has been satisfied, an identifier of the component or sensor, and/or a location of the component or sensor. The electronic communication may be transmitted, for example, over a wireless network, WiFi network, short-range network, Bluetooth network, local area network, and so on.

A facility 110 may also include a monitoring device 132, which may track a use characteristic of a resource (e.g., a unit or component). The use characteristic can include, for example, when, how or by whom a resource is being used. In various instances, monitoring device 132 may or may not be located within a unit 112 and/or facility 110. In some instances, monitoring device 132 can be configured to receive input (e.g., from an authorized user), which may indicate a use characteristic (e.g., that a scheduled or unscheduled use is beginning or has ended, a time that a use has started or completed, an entity engaged in a use, and so on).

In some instances, monitoring device 132 may be (e.g., via a wireless or wired connection) connected to one or more components 102 and/or one or more sensors 130. Such connections may enable monitoring device 132 to estimate a usage characteristic. For example, one or more intensity values (or a processed version thereof) from a light sensor or motion sensor may be compared to a threshold, and it may be determined that a unit is not being used if the value(s) are below a threshold. As another example, it may be estimated that a unit is in use so long as a particular type of component is detected as being within the unit. As yet another example, it may be estimated that a unit is in use when signals from a badge reader indicate that at least one person remains in the unit.

Monitoring device 132 can manage and update usage data store 134. Usage data store 134 can include usage data for (for example) particular resources, components, units, facilities, entities (e.g., clients), and/or use types. The usage data may include historical use data (e.g., a date, duration, time, use type, etc. of one or more uses) and/or statistics based thereupon. Thus, for example, usage data 134 may indicate, for a given unit, use type, and client, an average and variability of a duration of use of the unit by the client for the use type. Usage data store 134 may, but need not, be part of monitoring device 132. In some instances, usage data store 134 is remote from monitoring device 132, one or more units, one or more components and/or one or more facilities to which it pertains. In one instances, usage data store 134 is in the cloud.

Interaction system 100*b* can include one or more controlling devices 136. Each controlling device 136 can manage and update a resource timetable for one or more resources (e.g., component or unit). The timetable may include a schedule that indicates that particular blocks of times have been assigned to (or held for) particular entities or uses and/or that other particular blocks of times remain available for assignment. An assigned block may include or may be associated with one or more buffer time periods, such as a buffer time period to prepare a resource and/or a buffer time period to restore a resource.

In one instance, a controlling device 136 can be located within a facility or unit that includes, controls or is a resource pertaining to a resource timetable. In one instance, a controlling device 36 is located remote from a facility or unit that includes, controls or is a resource pertaining to a resource timetable.

Controlling device 136 may be configured to locally detect user input or to receive communications that identify user input, where the user input may identify a parameter for the resource timetable and/or a request. As one example, one or more detected parameters may identify a start time (e.g., date and/or time of day), end time, duration, entity or client and/or use type for a time-block assignment. Controlling device 136 may then verify that a time block consistent with the parameter(s) is available within a timetable and may generate an assignment of the time block to the client and/or for the use type. Generating the assignment may include updating a resource timetable data store 138 (e.g., which may be included within and/or remote from controlling device 136) so as to reflect the assignment and/or change an availability status of the assigned time period. Generating the assignment may also include or may trigger transmitting a communication to another device (e.g., a client device 105 or load balancing system 120). The communication may identify one or more parameters of the assignment.

As another example, a request may include a request to identify general availabilities that correspond to identified times (e.g., an identified date range). As yet another example, a request may include a request to identify time periods available for a particular entity, which may include general availabilities and time periods being held for that entity.

As yet another example, monitoring device 132 may receive a communication that identifies one or more parameters for a proposed assignment. Monitoring device 132 may present information corresponding to the proposed assignment via a user interface and may detect input indicating whether it has been accepted. If so, the assignment may be generated. If not, a response communication may be transmitted indicating this lack of acceptance, which may also include one or more other time blocks proposed for assignment.

In some instances, a single resource device 140 may act both as a monitoring device 132 and controlling device 136.

A load balancing system 145 may communicate with one or more: components 102, client devices 105, sensors 130, monitoring devices 132 and/or controlling devices 136. Load balancing system 145 may itself manage and/or update a usage data store 134 and/or resource timetable data store 138. In some instances, part or all of one or both of these data stores may mirror other corresponding data stores (e.g., located at and/or controlled by devices at one or more facilities). For example, load balancing system 145 may receive periodic communications (e.g., that may, but need not, be responsive to requests for such) from one or more controlling devices 136 and/or monitoring devices 132 that identify an update of a timetable associated with a particular facility, unit or resource or an update of usage data associated with a particular entity, use type, facility, unit or resource. Load balancing system 145 may update a corresponding data structure in a mirrored resource timetable data structure and/or usage data structure.

In one instance, load balancing system 145 may communicate with an independent server or device that manages resource timetables (e.g., by receiving communications from a plurality of controlling devices controlling individual resource timetables and by updating an aggregated data structure to reflect current assignments and availabilities). Such communications may enable load balancing system 145 to efficiently query multiple resource timetables and/or identify availabilities.

Load balancing system 145 may facilitate handling of assignment requests, timetable management and/or resource assignments. For example, load balancing system 145 may receive an electronic request from a client device 105 to generate a task assignment. Assigning a client-associated task to a given resource can include, for example, reserving a space and/or resource usage for the client for a designated time period such that the client can perform a task at the space during the designated time period. Client device 105 may correspond to a user device. Client device 105 may include, for example, a server, desktop computer, laptop computer, tablet or smart phone. Client device 105 may be configured to transmit and receive communications over a network, such as over a WiFi network and/or short-range network. In various instances, a given client may be associated with multiple client devices 105 or a single client device 105. Client device 105 may include a device configured to receive user input that identifies scheduling constraints and/or preferences for the electronic request. The electronic request may, but need not, include or be associated with one or more parameters, such as a time or time period (e.g., date range, date and time of day), geographic location (e.g., of a client device or requested unit or resource), use type, and/or task-assignment duration.

Load balancing system 145 may query a local or remote data store to identify usage data associated with at least one of the parameters. For example, the query may be to identify a maximum and minimum time of previous uses associated with a client and a use type corresponding to the request. As another example, the query may be to identify a percentage of instances in which a usage duration of a unit exceeded a requested usage duration for a particular client corresponding to the request. As yet another example, the query may be to identify all usage durations associated with a particular use type and facility corresponding to the request and with a recent time period, so as to enable load balancing system 145 to generate a use statistic (e.g., a median use time).

Based on the usage data, load balancing system 145 may determine whether and/or how to transform the request. For example, if usage data indicates that an actual usage time is likely to exceed a requested usage time, the requested usage time may be transformed into a new requested usage time based on the usage data. The new requested usage time may then be used to identify any availabilities in resource timetables that sufficiently correspond to the request. A determination as to whether an actual usage time is likely to exceed a requested usage time may include determining whether an actual usage time has exceeded a requested usage time for at least a threshold percentage of past instances or determining whether a statistic generated based on actual usage time exceeds a statistic generated based on requested usage time (e.g., an average or median time). Thus, in various instances, a requested usage time is transformed into a new requested usage time in all instances or in a conditional manner.

A new requested usage time may be identified as corresponding to a usage statistic. For example, a new requested usage time may be identified by identifying an average (or median or percentile mark) extent to which previous requested usage times differed from corresponding actual usage times and factoring a requested usage time of the present request by the average. As another example, a machine-learning technique (e.g., a neural network) may be used to generate an explicit or hidden relationship between inputs (e.g., request parameters and/or resource timetables) and a new requested usage time. As yet another example, a fixed relative (e.g., 15%) or absolute (e.g., 30 minute) addition may be added to the requested usage time when it is determined that the requested usage time is to be transformed.

Load balancing system 145 may then facilitate assigning a resource in response to the request. The facilitation may include generating and transmitting a transformed request to one or more controlling devices 136. In some instances, the transformed request includes modified and/or additional parameters as compared to a request received from a client request. For example, a transformed request may include a request with a new requested usage time.

The facilitation may include identifying an availability in a resource timetable for the request. For example, load balancing system 145 may query a resource timetable data store 138 that is local to and/or controlled by the system to identify availabilities in a timetable of a resource that would correspond to the request (e.g., and transformed usage data). If multiple corresponding availabilities are identified, load balancing system 145 may (in some instances) select a single availability based on a selection technique (e.g., to bias or select based on how soon the availability is, how geographically close the resource is to a location associated with the electronic request, a client preference, and so on). Whether a single availability or multiple availabilities are identified, load balancing system 145 may transmit a communication to a controlling device 136 that identifies information associated with the request and the availabili(ies) and/or a communication to client device 105 that identifies information associated with the availability(ies) (e.g., a time, resource identifier, resource location, resource specification, etc.).

The one or more controlling devices 136 (e.g., to which a transformed request is transmitted and/or for which timetables are considered to identify request-corresponding availabilities) may include, for example, a device corresponding to each of one or more specifically identified resources in a request from a client, a device corresponding to each of one or more resources satisfying a location criterion (e.g., being located within a defined absolute or relative distance from a location associated with the request or client device), a device corresponding to each of one or more resources having a specification corresponding to a task type (e.g., usage type) associated with the request, a device corresponding to one or more institutions having an affiliation matching an affiliation associated with the request, and so on.

Figure 2:
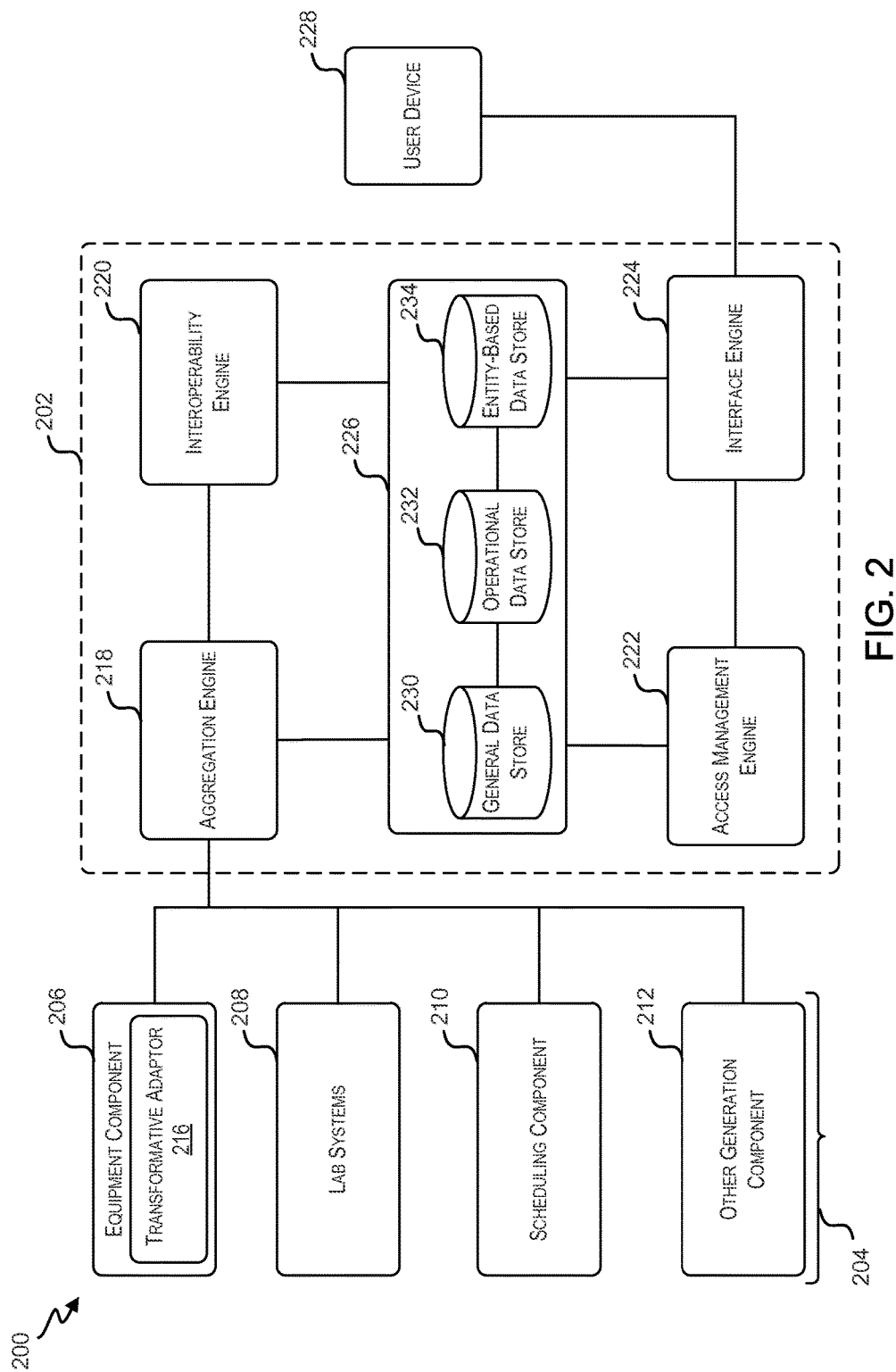
FIG. 2 shows a block diagram of an example of an interaction system.

Referring next to FIG. 2, a block diagram of an example of an interaction system 200 is shown. Interaction system 200 includes a transformative integration engine 202. Transformative integration engine 202 is an example of transformative processing engine 108 discussed with reference to FIG. 1. Interaction system 200 also includes one or more generation components 204. In particular, one or more generation components 204 includes an equipment component 206, a lab systems component 208, a scheduling component 210 and other generation component 212. One or more generation components 204 are examples of one or more components 102 discussed with reference to FIG. 1.

Generally, one or more generation components 204 includes any suitable device or system capable of generating data in the context of an interaction system. For example, the other generation component 212 may include a sensor on a door, and equipment component 206 may include a sophisticated computer-controlled laser device. In either case, each generation component generates some type of data. For example, the data provided by the sensor may be used to address security concerns or assessing heating, ventilating, and air conditioning (HVAC) costs for an institution. The data provided by the laser device may have been provided while engaged in a procedure and may then be used by other entities in the future to decide how to use the device.

As discussed in further detail herein, data generated by one or more generation components 204 can be of a variety of formats, some of which may be proprietary. For example, a single component can generate data in multiple formats, different components can generate data in different formats, and/or different component types can result in generation of data in different formats. In some instances, formatting of a data can depend on a service having been provided, a user initiating data generation, a destination to receive the data, a location at which a service was provided, etc. In some examples, a typical interaction system includes thousands of generation components producing data in hundreds of formats. In order to harness the power that comes from such a large amount of data to make informed decisions, it is desirable that all, or at least a large portion of the data, is shared. Use of transformative integration engine 202 in accordance with techniques described herein may achieve this design—making large amounts of data, in many different originating formats available to various types of users, via one or more interfaces.

While one or more generation components 204 are illustrated adjacent to each other, it is understood that each may be located within one facility or that the components may be spread out among many facilities. In addition, in some examples, one or more generation components 204 belong to different clients.

Turning now to equipment component 206, this component includes any machine, contrivance, implant, or other similar related article, that is intended to aid in reaching a particular objective. In some instances, equipment component 206 includes one or more sensors to detect environmental or other stimuli. Equipment component 206 can include, for example, equipment to monitor a stimulus, detect stimulus changes, detect stimulus-indicative values, and so on. Exemplary equipment components 206 include an imaging device, a device that detects and characterizes electrical signals, a device that detects pressure, and/or a device that detects concentration of one or more particular elements, compounds and/or gases.

As illustrated, equipment component 206 includes transformative adaptor 216. In some examples, transformative adaptor 216 is a device that transforms, translates, converts, or otherwise adjusts output data from equipment component 206. For example, an equipment component 206 can be a scanner that outputs its results in format A, but the majority of other scanners in the interaction system output their results in format B. Transformative adaptor 216 may be implemented to convert or otherwise adjust the results in format A to conform closer to format B. For example, the conversion from format A to format B may be performed using a conversion rule, which may be user-define or learned. Transformative integration engine 202 may perform similar tasks as it relates to all data generated within interaction system 200. In this manner, transformative adaptor 216 can perform an initial step in the process of transformation, translation, conversion, or adjustment of the output of equipment component 206. In some examples, transformative adaptor 216 is implemented in hardware, software, or any suitable combination of both. In some examples, other transformative adaptors (not shown) may be implemented within others of one or more generation components 204. In some examples, equipment component 206 may not include transformative adaptor 216.

Lab systems component 208 includes any suitable laboratory equipment or system that is intended to analyze material, such as biological material. This includes, for example, laboratory equipment that analyzes biological samples; electric microscopes; ultracentrifuges; data collection devices, including Kymographs, sensors connected to a computer to collect data; monitoring devices; computers used to report results of lab tests, and other similar laboratory equipment. Each of the above-listed components generates data that is provided (directly or indirectly) to transformative integration engine 202.

Scheduling component 210 includes any suitable computing devices used for business-related purposes with respect to interaction system 200. For example, scheduling component 210 can be configured to schedule a resource for allocation for a particular entity during a particular time slot. Scheduling component 210 can monitor a schedule for the resource and can identify one or more available time slots that may be secured by a particular entity. Upon receiving a scheduling indication, scheduling component 210 may update a schedule of a resource to reflect that a particular time slot is to be allocated for service of a particular entity.

Each of one or more generation components 204 and the user device 228 may include individual and/or shared storage systems, one or more processors, a user interface, a network connectivity device, and one or more ports. The storage system include memory that may be implemented, e.g., using magnetic storage media, flash memory, other semiconductor memory (e.g., DRAM, SRAM), or any other non-transitory storage medium, or a combination of media, and can include volatile and/or non-volatile media. The storage systems may also be configured to store computer-executable code or instructions for interacting with the user interface and/or for one or more applications programs, such as an application program for collecting data generated by the particular generation component.

The one or more processors may be configured to access the operating system and application programs stored within the storage systems, and may also be configured to execute such program code. The one or more processors can be implemented as one or more integrated circuits, e.g., one or more single-core or multi-core microprocessors or microcontrollers, examples of which are known in the art. In operation, the one or more processors can control the operation of the particular component. The one or more processors may access and execute the program code and at any given time.

The user interface can include any combination of input and output devices. In some instances, a user can operate input devices of the user interface to invoke the functionality of the particular component or user device. For example, the user interface may enable the user to view, hear, and/or otherwise experience output from component or user device via the output devices of the user interface. Examples of output devices include a display, speakers, and the like.

The network connectivity device may enable the component or user device to communicate with transformative integration engine 202 and other components or other user devices via one or more networks. The one or more networks may include any suitable combination of cable, cellular, radio, digital subscriber line, or any other suitable network, which may be wired and/or wireless. In some examples, the network connectivity device may enable the component or the user device to communicate wirelessly with various other components and/or transformative integration engine 202. For example, the components may include circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication.

The one or more ports may enable the component or the user device to receive data from one or more sensors. The sensors may be any suitable type of sensor to capture data. Such captured data may be shared with transformative integration engine 202 in accordance with techniques described herein. In some examples, the sensors may also be configured to detect the component's or the user device's location and other details about the component or the user device. In some examples, the component and user device may include global positioning chips for determining a geolocation. Such geolocation information may be relevant to analyzing the data provided by the component or the user device located at the geographic location.

Transformative integration engine 202 includes an aggregation engine 218, an interoperability engine 220, an access management engine 222, an interface engine 224, and a data store 226. Generally aggregation engine 218 is configured to collect data from multiple communications. The data may be from one or multiple generation components 204 and/or may be of a same or different formats. Aggregation engine 218 may be configured to perform one or more operations on the collected data. For example, aggregation engine 218 may tag data, log data, perform protocol conversion, and may support one-to-many communications. The collection may be asynchronous. In some examples, the data has been saved locally in connection with one or more generation components 204 in many different formats having many different data structures.

Aggregation engine 218 can identify data to be aggregated based on, for example, infra-communication data, a current time, a source generation component, and/or one or more aggregation rules. For example, an aggregation rule may specify that data is to be aggregated across all communications that include content with a same entity identifier. An aggregation may be dynamic. For example, aggregated data may reflect that from within a most recent 12-hour period. Thus, an aggregation may be updated in time to exclude older data from the aggregation and to include newer data.

Aggregation engine 218 can be configured to provide data from one or more communications to interoperability engine 220. Interoperability engine 220 can be configured to perform one or more operations on the received data and store it in data store 226. For example, interoperability engine 220 may perform semantic tagging and indexing of data. This may include extracting field values from data, categorizing data (e.g., by type of data, characteristic of an entity, location of facility, characteristic of facility, and the like), anonymizing or partially-anonymizing data, and the like. Interoperability engine 220 may also include a high availability cache, an alerts engine and a rules engine. In some examples, interoperability engine 220 operates synchronously.

From interoperability engine 220, data flows to data store 226. Data store 226 (and any other data store discussed herein) may include one or more data stores, which may be distributed throughout two or more different locations (e.g., present on different devices, which can include devices of different entities and/or a cloud server). In some examples, data store 226 includes a general data store 230, an operational data store 232, and an entity-based data store 234. Within each of the data stores 230, 232, and 234 is stored data. Depending on the structure of the particular data store, certain data stores may include rules for reading and writing. The data stores 230, 232, and 234 may include records, tables, arrays, and the like, which may be relational or non-relational. Depending on the data store, records for individual entities, business and analytics information, output data from one or more generation components 204, and the like may be retained. The data within the data stores 230, 232, and 234 include elements or tags such that a particular data (e.g., for a single entity, protocol, etc.) can be retrieved.

Access management engine 222 is configured to manage access to features of transformative integration engine 202, including access to the data retained in data store 226. For example, access management engine 222 may verify that a user device such as user device 228 is authorized to access data store 226. To verify the user device 228, access management engine 222 may require that a user of the user device 228 input a username and password, have a profile associated with the interaction system, have paid a subscription fee associated with access to data store 226, and the like. Access management engine 222 may also verify that the user device 228 has an IP address or geographical location that corresponds to an authorized list, that the user device 228 includes a plug-in for properly accessing data store 226, that the user device 228 is running certain applications required to access data store 226, and the like.

Interface engine 224 is configured to retrieve the data from data store 226 and provide one or more interfaces for interacting with elements of transformative integration engine 202. For example, interface engine 224 includes an interface by which an application running on user device 228 can access portions of data within data store 226.

Figure 3:
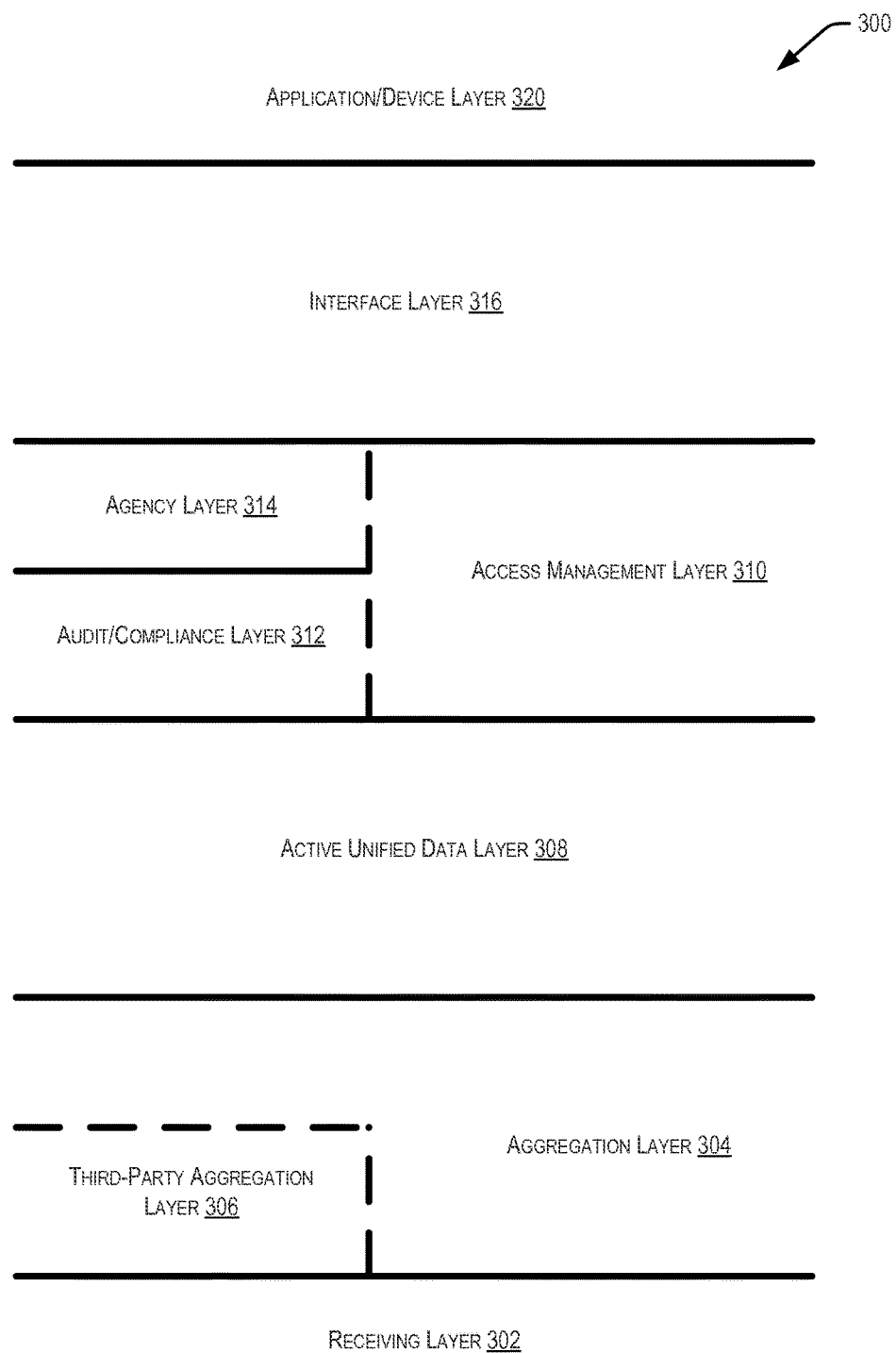
FIG. 3 shows an architecture stack according to an embodiment of the invention.

Turning next to FIG. 3, an architecture stack 300 is shown. In some examples, techniques relating management of data are implemented in accordance with architecture stack 300. And while architecture stack 300 is illustrated as having a particular structure, it is understood that other structures, including those with more or less layers than illustrated, is within the scope of this specification. In some examples, architecture stack 300 is implemented across an interaction system having a plurality of systems belonging to the same client or spread across different clients. Thus, architecture stack 300 can be used to integrate different systems of different organizations, entities, and the like and to provide a fluid sharing of information among elements within the interaction system and without the interaction system. In some instances, a multi-layer part of architecture stack 300 is implemented at a single system or device within an interaction system.

The different layers of architecture stack 300 will be described generally with reference to FIG. 3 and in detail with reference to subsequent figures. Architecture stack 300 includes a receiving layer 302 as the bottom-most layer. Receiving layer 302 includes receiving data from elements that share data with other elements within an aggregation layer 304. For example, as detailed herein, receiving layer 302 can include receiving data from generation components that generate data. As such, receiving layer 302 is where data that has been created is received. In some examples, the data within receiving layer 302 may be in its raw formats. The output may then be transmitted to aggregation layer 304. In some examples, components of receiving layer 302 may have complimentary layers to facilitate data transfer. For example, the components may include a data generation and/or a data transmission layer for providing data to receiving layer 302.

Elements of aggregation layer 304 aggregate the data generated by the elements of receiving layer 302. For example, the elements of aggregation layer 304 may include aggregation engines that collect data from generation components located within receiving layer 302. Such aggregation may be performed periodically, in response to a user request, according to a schedule, or in any other suitable manner. In some examples, data of aggregation layer 304 may be aggregated according to input and/or rules and may aggregate across records pertaining to, e.g., a facility, entity, time period, characteristic (e.g., demographic characteristic or condition), outcome, and any other suitable input and/or rules. The aggregation may include compiling the data, generating a distribution, generating a statistic pertaining to the data (e.g., average, median, extremum or variance), converting the data, transforming the data to different formats, and the like.

Next, architecture stack 300 includes an active unified data layer 308. Elements of active unified data layer 308 receive data from the elements of the other layers and store such data in a unified manner. In some examples, this may include storing the data in a manner that allows for later searching and retrieval using a defined set of method calls, techniques, and or procedures. For example, the data may be stored such that a different application can access the data in a standard or unified manner. Thus, elements of active unified data layer 308 may receive information collected or generated within aggregation layer 304 and make certain adjustments to the data (e.g., translations, tagging, indexing, creation of rules for accessing the data, conversion of formatting of the data, generation of compressed versions, and the like) prior to retaining the data within one or more data stores accessible within active unified data layer 308.

Architecture stack 300 also includes an access management layer 310, which can include an audit/compliance layer 312 and/or an agency layer 314. Access management layer 310 includes elements to manage access to the data. For example, access management layer 310 may include elements to verify user login credentials, IP addresses associated with a user device, and the like prior to granting the user access to data stored within active unified data layer 308.

Audit/compliance layer 312 includes elements to audit other elements of architecture stack 300 and ensure compliance with operating procedures. For example, this may include tracking and monitoring the other elements of access management layer 310.

Agency layer 314 includes an access location (e.g., a virtual private network, a data feed, or the like) for elements of agencies that are interested in the operations of the interaction system in which architecture stack 300 is implemented. For example, agency layer 314 may allow a governmental entity access to some elements within architecture stack 300. This may be achieved by providing the governmental entity a direct conduit (perhaps by a virtual private network) to the elements of access management layer 310 and the data within active unified data layer 308. Audit/compliance layer 312 and agency layer 314 are sub-layers of access management layer 310.

Architecture stack 300 also includes interface layer 316. Interface layer 316 provides interfaces for users to interact with the other elements of architecture stack 300. For example, clients, entities, administrators, and others belonging to the interaction system may utilize one or more user devices (interacting within application/device layer 320) to access the data stored within active unified data layer 308. In some examples, the users may be unrelated to the interaction system (e.g., ordinary users, research universities, for profit and non-profit research organizations, organizations, and the like) and may use applications (not shown) to access the elements within architecture stack 300 via one or more interfaces (e.g., to access data stored within active unified data layer 308). Such applications may have been developed by the interaction system or by third-parties.

Finally, architecture stack 300 includes application/device layer 320. Application/device layer 320 includes user devices and applications for interacting with the other elements of architecture stack 300 via the elements of interface layer 316. For example, the applications may be web-based applications, entity portals, mobile applications, widgets, and the like for accessing the data. These applications may run on one or more user devices. The user devices may be any suitable user device as detailed herein.

Figure 4:
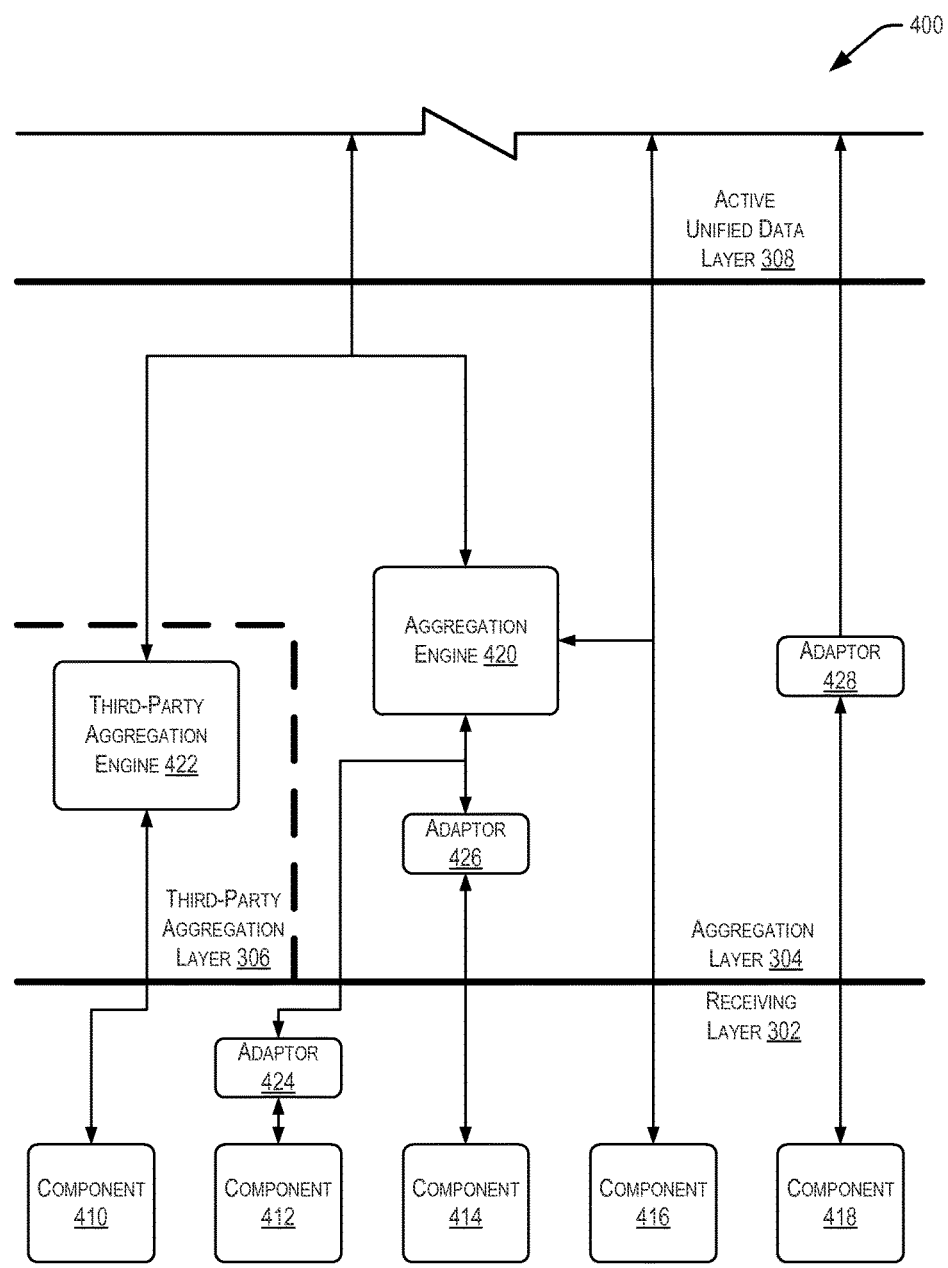
FIG. 4 shows a portion of an architecture stack according to an embodiment of the invention.

Turning next to FIG. 4, a diagram 400 is shown that depicts a portion of architecture stack 300 according to an embodiment of the invention. In particular, the diagram 400 includes receiving layer 302, aggregation layer 304, aggregation layer 306, and a portion of active unified data layer 308. Receiving layer 302 receives data from one or more components 410-418. Components 410-418 are examples of one or more generation components 204. Components 410-418 may be spread across multiple facilities within a single or multiple clients. In some examples, components 410-418 may include complimentary layers to facilitate data transmission. For example, components 410-418 may include a transmission layer, generation layer, and/or a receiving layer to communicate data at receiving layer 302 and, in some examples, receive data from receiving layer 302.

In some instances, two or more of components 410-418 generate data according to different formats. The data can then be transformed, translated, or otherwise adjusted before an aggregation engine 420 (e.g., aggregation engine 218) or a third-party aggregation engine 422 (e.g., aggregation engine 218) collects the data. In some examples, the adjustment takes place within receiving layer 302. Thus, an adaptor 424 is associated with component 412 located in receiving layer 302. Adaptor 424 is an example of transformative adaptor 216. Adaptor 424 is implemented, as appropriate, in hardware, software, or any suitable combination of both. For example, transformative adaptor 216 may be a bolt-on adaptor that adjusts data as such data leaves component 412.

Other adaptors, such as adaptor 426 and adaptor 428, are implemented within aggregation layer 304. These adaptors can function in a similar manner as adaptor 424. In some examples, the data provided by component 414 is transmitted through adaptor 426 prior to being directed to aggregation engine 420. The data provided by component 416 is transmitted through aggregation layer 304 and/or enters aggregation engine 420 without having first traveled through an adaptor. The data provided by component 418 is transmitted through aggregation layer 304 and through adaptor 428. In some examples, component 418 provides for streaming of data. The data provided by component 410 is transmitted directly to third-party aggregation engine 422.

Aggregation engine 420 and third-party aggregation engine 422 function in a similar manner. In some examples, third-party aggregation engine 422 is operated by a different entity than the entity that operates aggregation engine 420 and may belong to different clients or a different interaction system. This may be because the data collected by third-party aggregation engine 422 differs in some way from the data collected by aggregation engine 420. In any event, aggregation engine 420 is configured to perform integration of data, including generic integration. For example, aggregation engine 420 performs one or more operations on data including tagging, logging, and protocol conversion. Aggregation engine 420 also supports one-to-many communications of data. In some examples, data flows between aggregation engine 420, the third-party aggregation engine 422, and some of components 410-418 and elements of active unified data layer 308.

Figure 5:
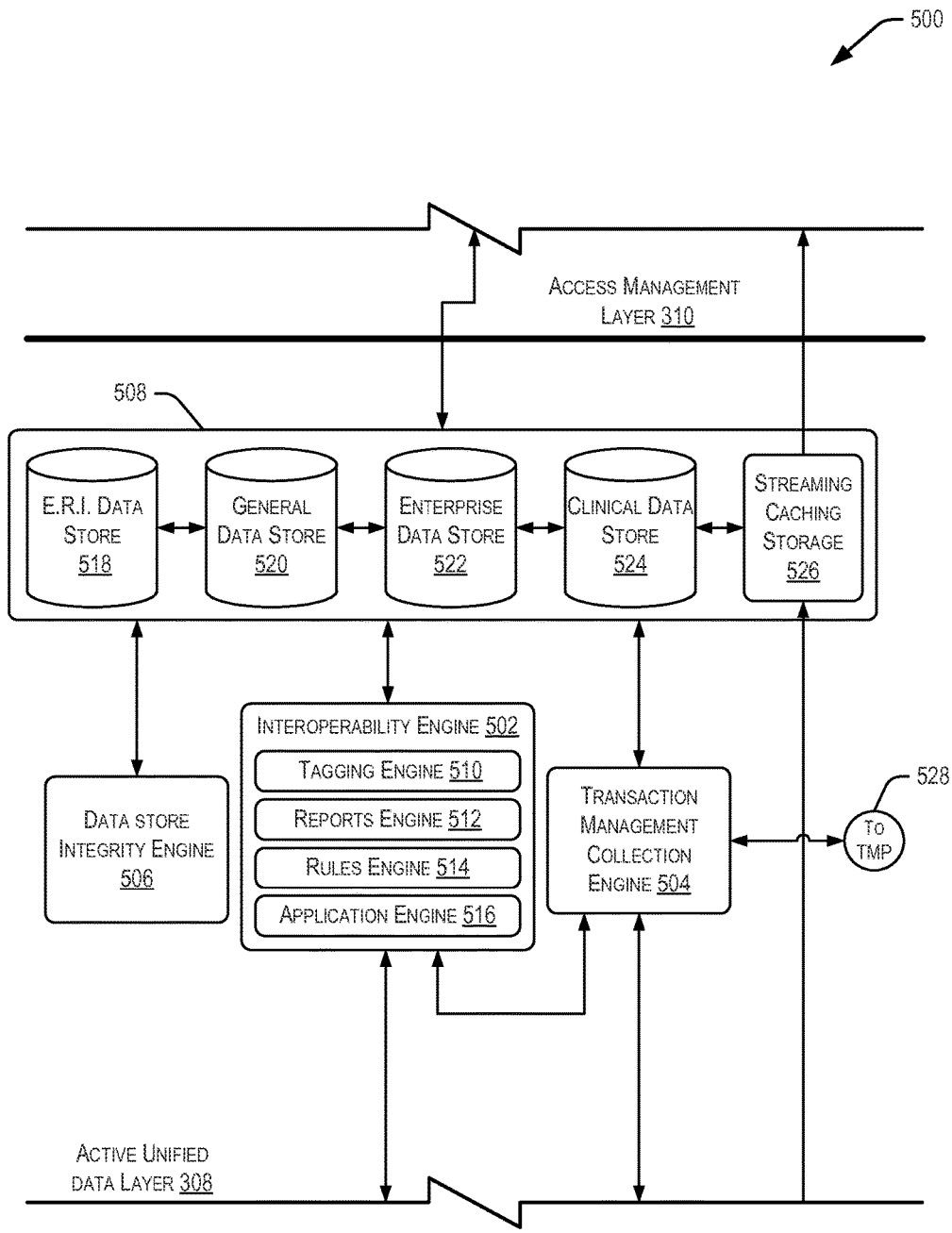
FIG. 5 shows a portion of an architecture stack according to an embodiment of the invention.

Referring next to FIG. 5, a diagram 500 is shown that depicts a portion of architecture stack 300 according to an embodiment of the invention. In particular, diagram 500 includes active unified data layer 308 and a portion of access management layer 310. Active unified data layer 308, as illustrated in diagram 500, includes an interoperability engine 502 (e.g., interoperability engine 220), a transaction management collection engine 504, a data store integrity engine 506, and a data store 508 (e.g., data store 226). Generally, interoperability engine 502 receives data from elements within aggregation layer 304 (e.g., from aggregation engine 420) and performs one or more operations with respect to the data. Interoperability engine 502 also facilitates storage of at least a portion of the processed information in data store 508.

Transaction management collection engine 504 is implemented as part of transaction management engine 106. Transaction management collection engine 504 is configured to generate message indicators identifying flows of data by and between elements of an interaction system implemented using the techniques described herein. The flows of information include messages which include data, and the message indicators include unique message identifiers that can be used to identify the messages. The unique message identifiers include information that can be used to uniquely identify the messages. For example, a unique message identifier for a particular message can include a concatenation of the following information stored in a table: a source application, a facility, a message type, and a message control identification (ID). The unique message identifier can also be the message control ID. The unique message identifier may be created as messages including data are transmitted from aggregation layer 304. The table may be stored in association with the transaction management platform 528.

In some examples, the table also includes information for tracking the progress of the message from an origination node to a destination node. For example, typically when a message (e.g., any communication of data) is first received by transformative processing engine 108 (e.g., interoperability engine 502), transaction management engine 106 (e.g., transaction management collection engine 504 of transaction management engine 106) may generate a unique identifier for the message in order to track that message as it moves throughout the interaction system. The unique identifier may be included in the header of the message such that when the next node (e.g., component, device, server, etc.) after transformative processing engine 108 receives the message, that node can report back to transaction management engine 106 that it saw the message. In this manner, transaction management engine 106 may enable end-to-end tracking of messages for the life of the message.

In one example, the messages are requests. The requests may be generated based on user input at one of the components. The requests may be received by transformative processing engine 108 and integrated into the system. In some examples, transaction management engine 106 may be notified that the requests have been received and may therefore be configured to generate message IDs for each request. These message IDs may then be associated with each of the requests. As the requests continue to move throughout the interaction system (e.g., away from transformative processing engine 108), transaction management engine 106 may be track their movement using the message IDs. If one of the requests does not make it to its destination, transaction management engine 106 (or part of the transaction management platform 528) may determine why the request was stopped. In some examples, this cause may be hardware related (e.g., an unplugged Ethernet cable, a broken router, etc.), software related (e.g., a router routing to the wrong location), or any other reason for orders not arriving at their correct destination.

In some examples, transaction management engine 106 (e.g., transaction management collection engine 504 of transaction management engine 106) may receive the message and/or message identifier directly from one of components 410-418. For example, one of components 410-416 may be configured to generate the unique message identifier and/or communicate directly with transaction management engine 106. The message also may travel via one or more intermediate nodes on its way to the destination node. In some examples, a node is a component such as components 410-418, which may be running an application. In some examples, the unique identifier and the routing of the message to its destination may be stored in a table that also includes: a geolocation of each node, a network from which the message originated, a type of node, the unique node identifier, and a time associated with the message leaving the origination node. In some examples, transaction management collection engine 504 provides unique message identifiers to other elements of the interaction system to monitor the messages as they move throughout the interaction system. Transaction management collection engine 504 also provides a portion of the unique message identifiers to a transaction management platform (indicated by a circle 528) for further analysis of the message identifiers. Such analysis may include reconciliation of lost messages, latency reporting, audit management and compliance, and other such analyses.

As mentioned previously, interoperability engine 502 is configured to store data in data store 508. A plurality of sub-engines 510-516 of interoperability engine 502 are configured to perform operations relating to storing data in data store 508.

Interoperability engine 502 includes a tagging engine 510 configured to perform semantic tagging and indexing of data. Tagging engine 510 therefore is configured to receive data, read metadata associated with the data, semantically scan the content of the data, and associate one or more tags with the data. Tagging engine 510 may therefore have access to hundreds, thousands, or even more possible tags. These tags may have been input by users, learned, pre-defined, generated by outside third-party mapping sources, and/or gathered from other components and/or data stores of the interaction system. For example, if the data is a chart for an entity, the tagging engine may be configured to read any metadata associated with the chart to determine which tags may be appropriate to associate with the chart. From the metadata, tagging engine 510 may determine that the chart is for a type of entity by reading metadata indicating that an author field is populated with the name of another particular type of entity. Tagging engine 510 may have access to other data to compare the analyzed metadata against (e.g., to identify that the author's name corresponds to Dr. Brown who is an oncologist). Other examples, of metadata that may be included in one or more fields include author, document type, creation time and date, last update time and date, upload time and data, geographic location, unique ID associated with the client or facility where the data originated, and other similar fields. The tags may be stored in association with the data (e.g., the chart) and/or may be stored independent from the data but include an identifier such that when searching tags the data may be capable of population.

Continuing with the example from above, if the data is a chart for a first type of entity, tagging engine 510 may be configured to read the content of the chart to determine which tags may be appropriate to associate with the chart. For example, this may comprise analyzing the content of the chart (i.e., individual pages) semantically to look for artifacts (e.g., keywords, phrases, and the like) in the content. These artifacts may be identified by tagging engine 510 and used to decide which tags to associate with the document. In some examples, semantic scanning may involve filtering out words (e.g., articles, such as "a" and "the"), phrases, and the like. Similar to the reading of metadata, the tags may be pre-defined, user-defined, learned, and the like. In some examples, reading metadata associated with messages may provide meaning and/or give context to the particular record of data. This meaning and/or context may assist tagging engine 510 to determine one or more tags to associate with the data. The tags may be chosen, for example, based on values of particular fields in the data, detecting a frequency of one or more words in a document or metadata and/or of a set of related words (e.g., tagging a record with "cancer" upon detecting words such as tumor, metastasize, chemotherapy, radiation, oncology, malignant, stage 3, etc.). In this manner, tagging engine 510 may also index portions of the data within one or more data stores of data store 508. In some examples, such indexing may be based in part on the selected tags.

Interoperability engine 502 also includes a reports engine 512 configured to generate one or more reports or alerts based on data. For example, reports engine 512 may generate reports when certain types of data are received or when data with certain characteristics is received. Reports engine 512 may also generate alerts. The reports and/or alerts generated by reports engine 512 may be outputted in the form of one or more communications to an administrator, an authorized user, or other similar user via a user device. Such communications can include, for example, signals, sirens, electronic notifications, popups, emails, and the like. Content of such communications may include information characterizing a performance metric, efficiency and/or outcomes; identifying concerning patterns; identifying losses of data; and the like. In some examples, the content is presented in the form of one or more documents, tables, figures, charts, graphs, and the like.

Interoperability engine 502 also includes a rules engine 514 configured to create and manage business rules, condition-response rules, alert/reports rules, data-formatting rules, data-sharing rules, transmission rules, aggregation rules, user authorization rules, and other similar rules. Such rules may be user-defined, fixed, learned by elements of the interaction system, and any combination of the foregoing. Finally, interoperability engine 502 includes an application engine 516 configured to provide service-oriented architecture web services.

Data store 508 includes an electronic record information data store 518 ("record data store 518"), a general data store 520, an operational data store 522, an entity-based data store 524, and a streaming caching storage 526. While data store 508 is illustrated as including a fixed number of data stores and storage elements, it is understood that data store 508 can include any suitable number of data stores and storage elements, including more than illustrated or less than illustrated.

In some examples, a data query script is provided to query a first data store and/or to obtain data for populating a data store. Such script could query a data store described herein (e.g., data store 508) and/or could be used to obtain data to populate a data store described herein (e.g., data store 508). In one instance, the script is configured to be repeatedly executed, so as to repeatedly draw data from a source data store. The retrieved data can then be formatted, filtered, sorted and/or processed and then stored, presented and/or otherwise used. In this manner, the script can be used to produce streaming analytics.

In some instances, the data query script, when executed, identifies each of the data stores of interest. Identifying the data stores of interest involves identifying at least a portion of data from the data stores simultaneously and/or sequentially. For example, the script can identify corresponding data stores (e.g., or components of a single data store or multiple data stores) that pertain to one or more similar variables but that differ in one or more other variables. Once the portion of the data from the data stores is identified, a representation of the identified data can be output to one or more files (e.g., Extensible Markup Language (XML) files) and/or in one or more formats. Such outputs can then be used to access the data within one or more relational database accessible using Structured Query Language (SQL). Queries made using SQL can be made sequentially or in parallel. Results from an SQL query may be stored in a separate database or in an XML file that may be updated either in part or as a whole. The data query script may be executed periodically, in accordance with a user-defined rule, in accordance with a machine-defined or machine-learned rule, and in other suitable manner.

[Within record data store 518 is retained data including electronic record information. In some examples, the information within record data store 518 is organized according to entity identifying information. Thus, record data store 518, in some examples, includes individually identifiable information. But it may also include de-identified information.

Within general data store 520 is retained data. The data may be stored in a relational database format or in any other suitable format. Thus, the data within general data store 520 may be retained in a data structure that includes one or more tables capable of accessing each other. In some examples, general data store 520 includes a subset of the information that is included in operational data store 522.

Within operational data store 522 is retained data in a relational database format. Thus, the data within operational data store 522 may be retained in a data structure that includes one or more data structures (e.g., tables) capable of accessing each other. Operational data store 522 is an example of an operational data warehouse. In operational data store 522 is joined many different types of data. F2. In some examples, the operational data ware house 522 includes data pertaining to decision making as discussed herein and other data typically used by conventional business concerns.

Within entity-based data store 524 is retained data in a non-relational database format. Thus, the data within entity-based data store 524 may be retained in a structure other than tables. Such structure may be appropriate for large and complex data sets. In some examples, entity-based data store 524 (or any other data store) may be a unified system, which may include: a document-centric, schema-agnostic, structure-aware, clustered, transactional, secure, database server with built-in search and a full suite of application services. An example of such a unified system may be Marklogic. Entity-based data store 524 can support data aggregation, data organization, data indexing, data tagging and mapping to semantic standards, concept matching, concept extraction, machine learning algorithms, concept discovery, concept mining, and transformation of personal record information. In some examples, entity-based data store 524 includes data pertaining to decision making (similar to general data store 520) as discussed that is organized and accessed in a different manner. For example, the data within entity-based data store 524 may be optimized for providing and receiving information over one or more information exchanges. In some examples, entity-based data store 524 includes a subset of the information that is included in operational data store 522.

Finally, in some examples, streaming caching storage 526 is a streaming data cache data store. As discussed previously, certain components of components 410-418 may support streaming data to other components or user devices. Streaming caching storage 526 is a location where streaming data can be cached. For example, assume that component 418 is a piece of equipment operating at Location A and that a user using a computer in Location B desires to view a live of substantially live stream of outputs of the piece of equipment. Component 418 can send a portion of data to streaming caching storage 526 which can retain the portion of the data for a certain period of time (e.g., 1 day). Thus, streaming caching storage 526 is configured to cache data that can be streamed.

Diagram 500 also includes data store integrity engine 506. In some examples, data store integrity engine 506 is configured to ensure integrity of the information within data store 508. For example, data store integrity engine 506 applies one or more rules to decide whether information within all or part of data store 508 should be scrubbed, removed, or adjusted. In this manner, confidence is increased that the information within data store 508 is accurate and current.

Figure 6:
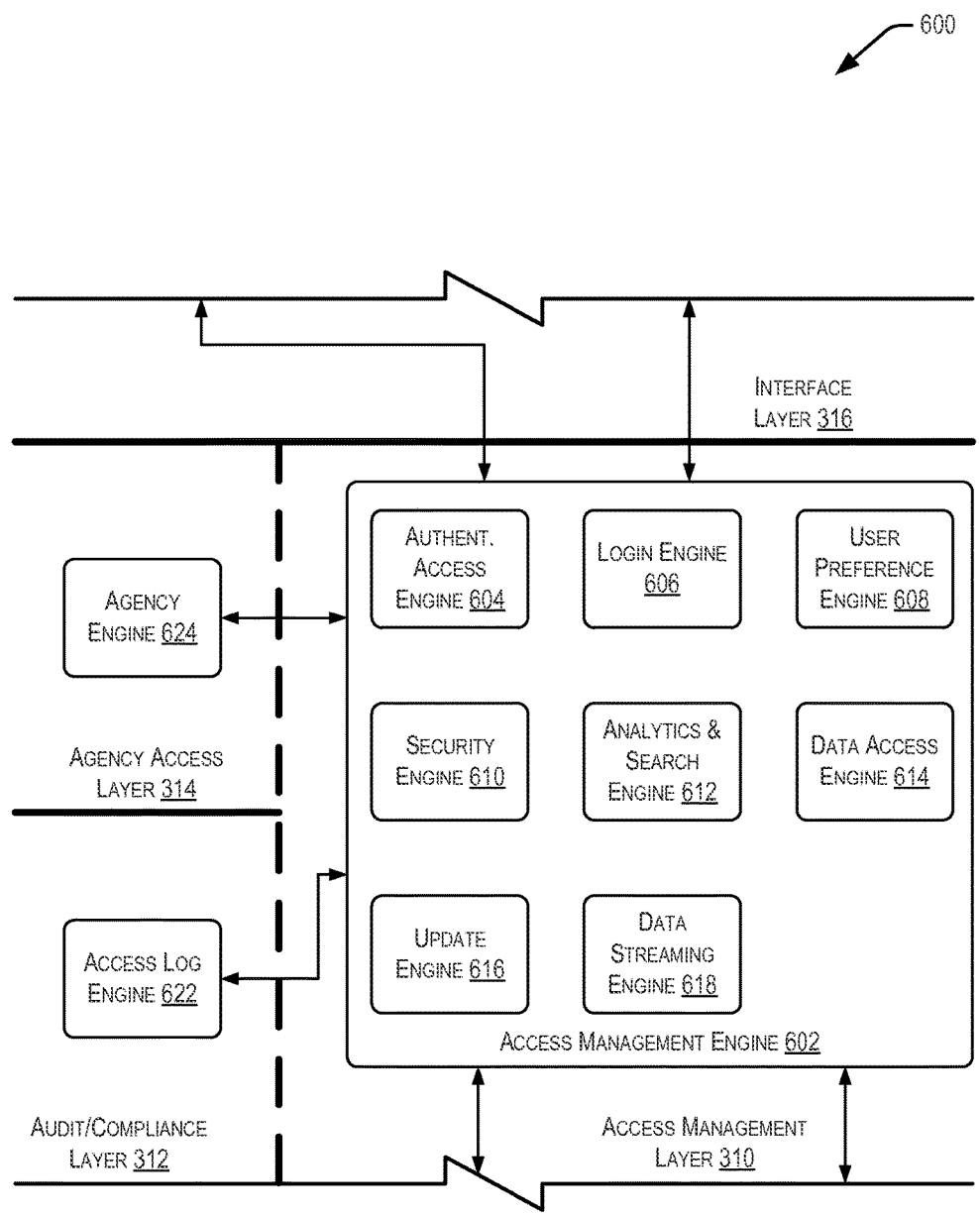
FIG. 6 shows a portion of an architecture stack according to an embodiment of the invention.

FIG. 6 shows a diagram 600 which depicts a portion of architecture stack 300 according to an embodiment of the invention. In particular, the diagram 600 includes access management layer 310, audit/compliance layer 312, agency layer 314, and a portion of interface layer 316.

Access management layer 310, as illustrated in the diagram 600, includes an access management engine 602. Access management engine 602 is an example of access management engine 222. Generally, access management engine 602 can be configured to manage access to elements of transformative integration engine 202 by different components, applications, and user devices.

Access management engine 602 within access management layer 310 also provides functionality similar to an operating system. For example, access management engine 602 includes a plurality of engines configured to manage different aspects of interacting with elements of the interaction system. For example, a user who desires to access portions of data retained in data store 508, may do so by interacting with access management engine 602 using one or more applications (not shown). Thus, access management engine 602 includes a variety of engines to enable such interaction. The engines include, for example, an authentication access engine 604, a login engine 606, a user preference engine 608, a security engine 610, an analytics and search engine 612, a data access engine 614, an update engine 616, and a streaming data engine 618. The different engines of access management engine 602 can define routines, protocols, standards, and the like for interacting with elements of the interaction system.

Beginning first with authentication access engine 604, authentication access engine 604 evaluates the rules and conditions under which users may access elements of the interaction system; in particular, the conditions under which users may access data within data store 508. These rules and conditions may be user-defined (e.g., by an administrator or reviewer), learned over time, and/or may be dynamically updated and/or evaluated based on characteristics of the user or the user's device attempting to access the interaction system. The rules and conditions may indicate the types of users who have particular types of access within the interaction system. The type of access may also relate to the degree to which data is identified/de-identified. In some examples, a user desiring access to data provides certain identifying information and authentication access engine 604 authenticates an identity of the user.

Login engine 606 evaluates the rules and conditions under which users are able to log in to the interaction system or access applications associated with the interaction system. These rules and conditions may be user-defined (e.g., by an administrator), learned over time, and also may be dynamically updated and/or evaluated based on characteristics of the user or the user's device attempting to access the interaction system. Thus, while authentication access engine 604 evaluates the rules to determine which users may access the interaction system, login engine 606 evaluates the particular credentials, profiles, etc. of the users. For example, login engine 606 can confirm that an entered username (e.g., and password), provided biometric data or code or identifier in a scanned tag or badge matches that in an authorized user data structure.

Login engine 606 evaluates one or more user profiles associated with each authenticated user. In some examples, a user profile includes a username, password, and other information associated with the user. For example, a user profile may indicate characteristics about the user.

User preference engine 608 evaluates the rules and conditions under which user are able to store and update one or more user preferences corresponding to access of the interaction system or access to applications associated with the interaction system. These rules and conditions may be user-defined (e.g., by the user or administrator), and may include rules for default preferences. For example, using user preference engine 608, a user may indicate a format in which the user prefers to receive outputted information, display characteristics of a graphical user interface associated with the user, and other similar user preference settings. For example, the user may indicate that certain types of reports and/or alerts are to be sent to the user.

Security engine 610 evaluates the rules and conditions for ensuring the security of access to the elements of the interaction system. In some examples, these rules and conditions are determined by administrators of the interaction system. In some examples, security engine 610 provides a plurality of computer virus protection services. These services can be called up and implemented when accessing the interaction system or accessing applications associated with the interaction system. The rules and conditions may be based on roles, based on profiles, based on domains, and any other suitable security configuration. For example, because the interaction system may include sensitive data, security engine 610 may enforce a domain-based rule that protects certain sensitive information (e.g., identifying information).

Analytics and search engine 612 evaluates the rules and conditions under which users can search for data within the interaction system and access analytics relating to the interaction system. In some examples, these rules and conditions are user-defined or learned over time in accordance with search engine optimization techniques. For example, analytics and search engine 612 is used to search within data store 508 for particular data. Analytics and search engine 612 supports any conventional searching algorithms. For example, search engine 612 can be used to search within various fields and potential field values. In some examples, search engine 612 can provide analytics, such as statistics, graphs, distributions and/or comparative analysis pertaining to particular entities and/or characteristics. Such information may be selected by a user and presented on a user interface.

Data access engine 614 evaluates the rules and conditions under which users may operation in order to access particular data within data store 508. In some examples, these rules and conditions are user-defined or learned over time. For example, data access engine 614 may indicate the routines, subroutines, or other logic needed for an application to access certain portions of data store 508. For example, while authentication access engine 604 and login engine 606 may manage which users can access parts of the interaction system, data access engine 614 may manage how authenticated users access data within data store 508. To this end, data access engine 614 may enforce and/or evaluate certain rules managing how users access different components of the interaction system. In some examples, data access engine 614 may be used to actually access data within data store 508 (e.g., extract, download, or otherwise access). In some examples, data access engine 614 may define procedures, protocols, and the like for accessing data. The protocols and procedures for accessing data access engine 614 (like the other engines of access management engine 602) may be provided to developers in the form of a software development kit (SDK). SDKs may enable developers write applications that can effectively communicate with elements (e.g., data store 508) of the interaction system. In particular, applications that can access a portion of the data stored within active unified data layer 308.

Update engine 616 evaluates the rules and conditions for providing updates to other engines within access management engine 602, plug-ins for applications that access the interaction system, and for other similar elements of the interaction system. For example, updates may be generated at runtimes, at defined time intervals, upon request by a user, upon receiving a threshold quantity of new or changed data. Once an update is performed, an interface may be refreshed, a report may be sent indicating that the update was successful or unsuccessful, or the like.

Streaming data engine 618 defines the rules and conditions for enabling streaming of data between components and user devices of the interaction system. For example, streaming data engine 618 may enable component 414 to stream data. Streamed data may include live or substantially live audio or video feeds, results of tests, output from equipment or devices, and any other suitable type of data capable of being streamed. In some examples, the data may be streamed to other components or user devices within the network or outside the network. In order to establish a streaming transmission, streaming data engine 618 may identify a streaming destination and a streaming origin. Next, streaming data engine 618 may pair the two and enable streaming. This may include allocated bandwidth within one or more network devices associated with the interaction system. Streaming data engine 618 may also adjust the quality of the streaming data based on the availability of bandwidth. In some examples, streaming data engine 618 may receive incoming streams (and continuously present the stream or monitor for particular data (e.g., exceeding a threshold, exhibiting an above-threshold change, having a particular value)).

Within audit/compliance layer 312 is located an access log engine 622. Access log engine 622 evaluates the rules and conditions for logging access to the interaction system by users, applications, devices, and the like. Logging access includes, in some examples, logging data conventionally collected by access log engines running in similar environments. Access log engine 622 can use this data to generate and transmit reports, for example, to stakeholders of the interaction system such that they can make informed decisions regarding that is accessing the interaction system and for what purposes.

Within agency layer 314 is located an agency engine 624. Agency engine 624 evaluates the rules and conditions under which agencies can access the interaction system. For example, agencies that may use agency engine 624 include agencies to which the interaction system provides compliance, tracking, or other reporting information. For example, agency engine 624 may be used to track one or more performance indicators identified by a government agency and/or to provide report instances of defined types of events. Thus, in some examples, a government agency uses agency engine 624 to collect data pertaining to compliance of the interaction system with one or more statutes or regulations. In some examples, a university is an agency that uses agency engine 624 to collect data pertaining to one or more studies. In some examples, agency engine 624 can identify one or more entities (e.g., governmental agencies) that are to receive reports pertaining to operations or events and what types of data are to be reported to those entities. Agency engine 624 can then collect the pertinent data, potentially format and/or analyze the data, and facilitate transmission of (e.g., raw, formatted and/or analysis of) the data to the appropriate agency.

Figure 7:
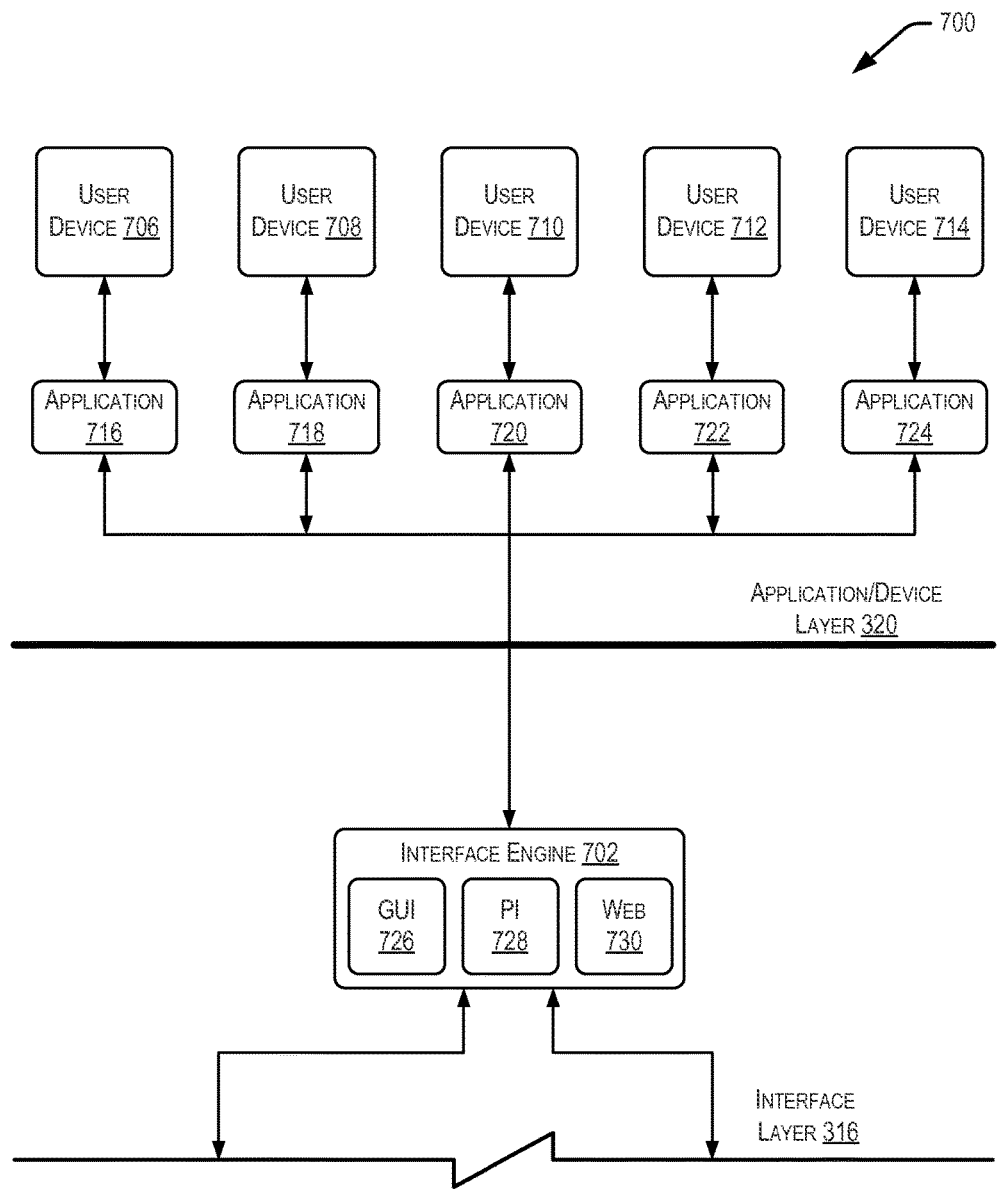
FIG. 7 shows a portion of an architecture stack according to an embodiment of the invention.

FIG. 7 shows a diagram 700 which depicts a portion of architecture stack 300 according to an embodiment of the invention. In particular, diagram 700 includes interface layer 316, and application/device layer 320. Within interface layer 316 is located interface engine 702 (e.g., interface engine 224). Interface engine 702 is configured to generate one or more interfaces (e.g., graphical user interface 726, programmatic interface 728, and/or web interface 730) to enable data to flow to user devices 710, 712, and 714 via respective applications 720, 722, and 724. In some examples, the interfaces of interface engine 702 are embodied in hardware, software, or some combination of both. Within interface layer 316 communications and inputs directed to interacting with elements of access management layer 310 may be embodied.

Graphical user interface 726 is any suitable graphical user interface configured to interact with elements of the interaction system. Programmatic interface 728 includes an application programming interface, a programmatic user interface, and other similar interfaces for defining core functions for accessing elements of the interaction system. For example, programmatic interface 728 may specify software components in terms of their operations. Web interface 730 is any suitable web interface configured to interact with elements of the interaction system. Any of the interfaces described herein may be configured to receive user input, present dynamic presentations that depend on user input, and otherwise respond to user input. In some examples, such input may be provided via one or more input devices (e.g., a keyboard, touchscreen, joystick, mouse, microphone, devices capable of capturing inputs, and the like) operated by one or more users of user devices 706-714. Output may be provided via one or more output devices (e.g., a display or speaker).

Interface engine 702 is utilized by applications internal to the interaction system and external to the interaction system to access data. In some examples, the applications that are internal include applications that are developed for internal use by various entities associated with the interaction system. In some examples, the applications that are external to the interaction system include applications that are developed for external use by those that are not associated with the interaction system.

Generally, within application/device layer 320, applications 716-724 which communicate with other elements of architecture stack 300 using the interfaces generated by interface engine 702 are defined. This includes detailing how applications 716-724 are to interact with the interfaces generated by interface engine 702 for accessing data. For example, interacting may include accepting inputs at user devices 706-714 to access data and, in response, providing the data, prompts, or other types of interaction with one or more users of the user devices 716-714. Thus, applications 716-724 may be related to one or more of the interfaces generated by interface engine 702. For example, application 720 may be interact with a graphical user interface (whether generated by interface engine 702 or otherwise) to interact with other elements of the interaction system. Interacting may include receiving inputs at the graphical user interface via application 720, providing output data to the graphical user interface application 720, enabling interaction with other user devices, other applications, and other elements of the interaction system, and the like. For example, some of the inputs may pertain to aggregation of data. These inputs may include, for example, types of data to aggregate, aggregation parameters, filters of interested data, keywords of interested data, selections of particular data, inputs relating to presentation of the data on the graphical user interface, and the like. Providing output data may include providing the aggregated data on the graphical user interface, outputting the information to one of the other user devices 706-714 running one of the other applications 716-724.

Turning now to the details of applications 720, 722, and 724. In some examples, applications 720, 722, and 724 include a variety of different applications that can be designed for particular users and/or uses. In one example, application 720 includes dashboards, widgets, windows, icons, and the like that are customized for an particular entity. In some examples, application 720 may present different data depending on a specialty associated with the entity and protected information associated with the entity. In this manner, application 720 adapts and automatically adjusts depending on the context in which the entity is using the application. In some examples, the data indicates performance statistics for the entity, metrics relating to where the entity falls along a distribution of other similar entities, outlier instances, trends in events or actions, and the like. Application 720 may be configured to receive input, adjust presentations, present unprompted alerts, adjust display of content, move more relevant content to the foreground, move less relevant content to the background, populate forms for the entity.

In another example, application 722 may be specific for nurses or types of nurses. In this example, application 722 may include dashboards, widgets, windows, icons, and the like that are customized to individual nurses. Similar to the example discussed above pertaining to the doctor, in some examples, application 724 may present different data depending on a position of the nurse. In this manner, application 722 adapts and automatically adjusts depending on the context in which the nurse is using the application. For example, the nurse may receive data, such as test results.

In some examples, application 724 may be a multi-role application for administrators and is used to manage entities constitute the population of the entities or organizations within the interaction system. Similar to the other examples discussed, in some examples, application 724 may present different data depending on a role of the user who is using application 724. In this manner, application 724 adapts and automatically adjusts depending on characteristics of the user who is using application 724. In this manner, application 724 can provide different data depending on the role of the user. For example, whether data presented includes identifiable or de-identified information may depend on a position of the user.

In some examples, application 724 may be a business intelligence application. In this example, application 724 is used to display business information generated by components of the interaction system. This business information can be used for operations, planning, and forecasting. Such business information may include data because such data may impact operations, planning, forecasting, and the like. Accordingly, application 724 may present de-identified information in the form of one or more metrics, indicators, or the like as they pertain to business intelligence.

Applications 716 and 718 shown in connection with interface engine 702 are applications developed by third-parties. In some examples, such applications include any suitable application that benefits from accessing data. The interaction system may include data pertaining to hundreds of thousands of entities. Having data pertaining to so many entities presents security concerns. For example, much of the data may be identifying data. Accordingly, data that may be accessed by applications 716 and 718 may be limited. In some examples, an entity of the interaction system may use one of applications 716, 718 to access his or her own data. In this example, the identity of the entity may be verified in accordance with techniques described herein.

User devices 706-714 are any suitable user devices capable of running applications 716-724. User devices 706-714 are examples of the user device 228. In some examples, the user devices include: mobile phones, tablet computers, laptop computers, wearable mobile devices, desktop computers, set-top boxes, pagers, and other similar user devices. In some examples, at least some of user devices 706-714 are the same devices as at least some of the one or more components 410-418. In some examples, user devices 706-714 may include complementary layers to application/device layer 320 and/or receiving layer 302. For example, user devices 706-714 may include a transmission layer, a generation layer, and/or a receiving layer to communicate data at application/device layer 320 and at receiving layer 302.

Figure 8:
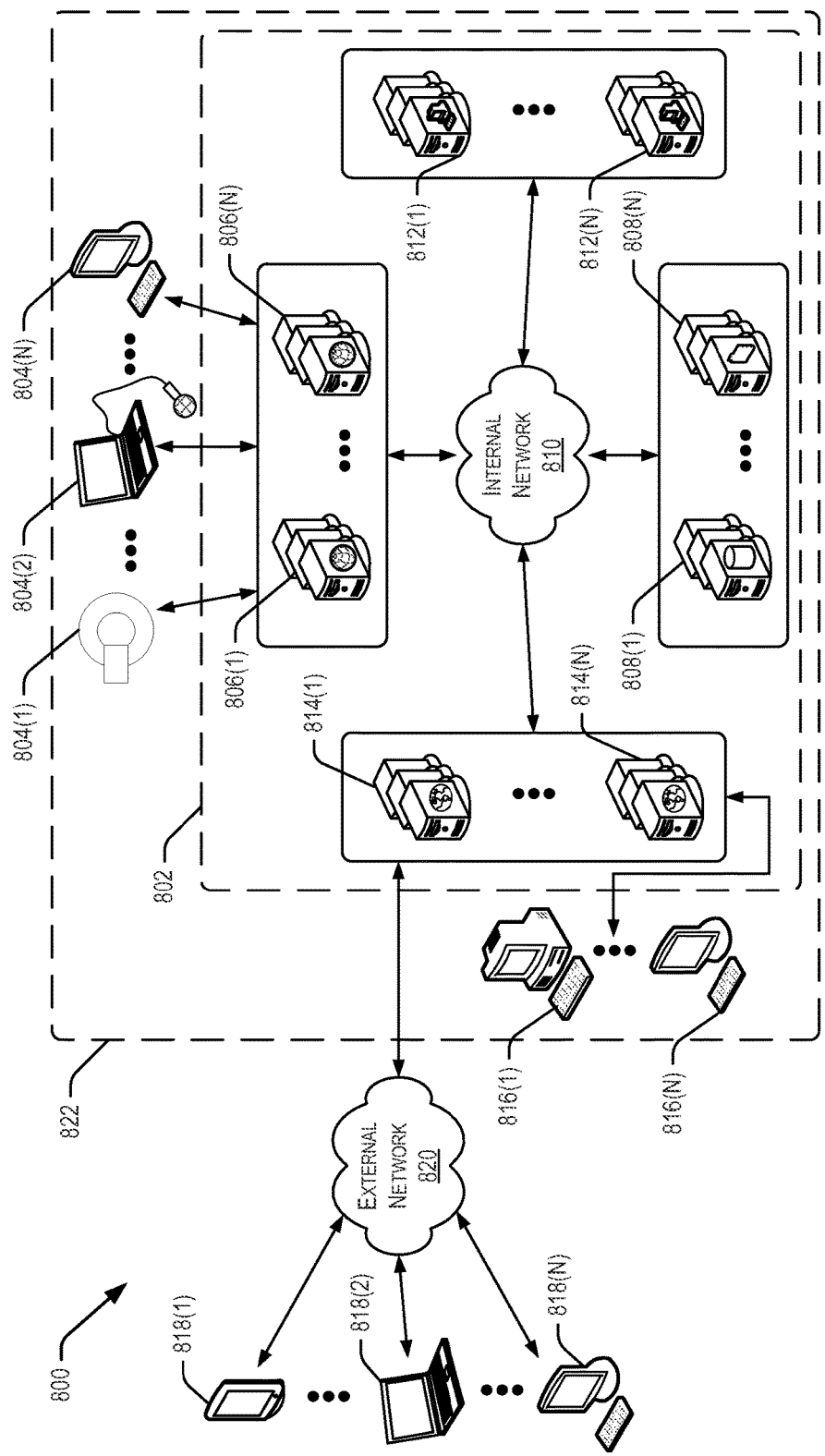
FIG. 8 shows an interaction system in accordance with an embodiment of the invention.

Turning now to FIG. 8, an interaction system 800 is shown in accordance with an embodiment of the invention. Interaction system 800 includes an internal organization 822 including a transformative integration engine 802. The transformative integration engine 802 is an example of transformative integration engine 202 previously discussed. Interaction system 800 is illustrated as an example configuration for implementing the techniques described herein. In particular, a configuration of elements as illustrated in FIG. 8, at least in some examples, communicates according to the layers of architecture stack 300. For example, internal organization 822 includes generation components 804(1), 804(2), and 804(N) which provide data to aggregation servers 806(1)-806(N).

Generation components 804(1), 804(2), and 804(N) operate in accordance with receiving layer 302. In some examples, generation component 804(1) is a piece of equipment, generation component 804(2) is computer with a data collection device, a type of lab system, and generation component 804(N) is a terminal. Aggregation servers 806(1)-806(N) operate in accordance with aggregation layer 304. Aggregation servers 806(1)-806(N) share data with data storage servers 808(1)-808(N) via one or more internal network(s) 810. In some examples, internal network 810 is any suitable network capable of handling transmission of data. For example, internal network 810 may be any suitable combination of wired or wireless networks. In some examples, internal network 810 may include one or more secure networks. Data storage servers 808(1)-808(N) are configured to store data in accordance with active unified data layer 308. Data storage servers 808(1)-808(N) include database servers, file storage servers, and other similar data storage servers.

Access management servers 812(1)-812(N) manage access to the data retained in the data storage servers 808(1)-808(N). Access management servers 812(1)-812(N) communicate with the other elements of interaction system 800 via internal network 810 and in accordance with access management layer 310.

Interface servers 814(1)-814(N) provide one or more interfaces applications to interact with the other elements of interaction system 800. Interface servers 814(1)-814(N) provide the one or more interfaces and communicate with the other elements of interaction system 800 via internal network 810 and in accordance with interface layer 316. The interfaces generated by the interface servers 814(1)-814(N)

can be used by internal user devices 816(1)-816(N) and external user devices 818(1), 818(2), and 818(N) to interact with elements of interaction system 800.

Internal user devices 816(1)-816(N) are examples of user devices 706-714. In some examples, internal user devices 816(1)-816(N) run applications via the interfaces generated by interface servers 814(1)-814(N). As an additional example, external user devices 818(1), 818(2), and 818(N) can run applications developed by third parties that access the other elements of interaction system 800 via the interfaces generated by interface servers 814(1)-814(N).

External user devices 818(1), 818(2), and 818(N) access the interfaces via external network 820. In some examples, external network 820 is an unsecured network such as the Internet. External user devices 818(1), 818(2), and 818(N) are examples of user devices 706-714. External user device 818(1) is a mobile device. In some examples, the mobile device may be configured to run an application to access interaction system 800. Similarly, the other external user devices 818(2)-818(N) run applications that enable them to access interaction system 800. While interaction system 800 is shown as implemented using discrete servers, it is understood that it may be implemented using virtual computing resources and/or in a web-based environment.

Figure 9:
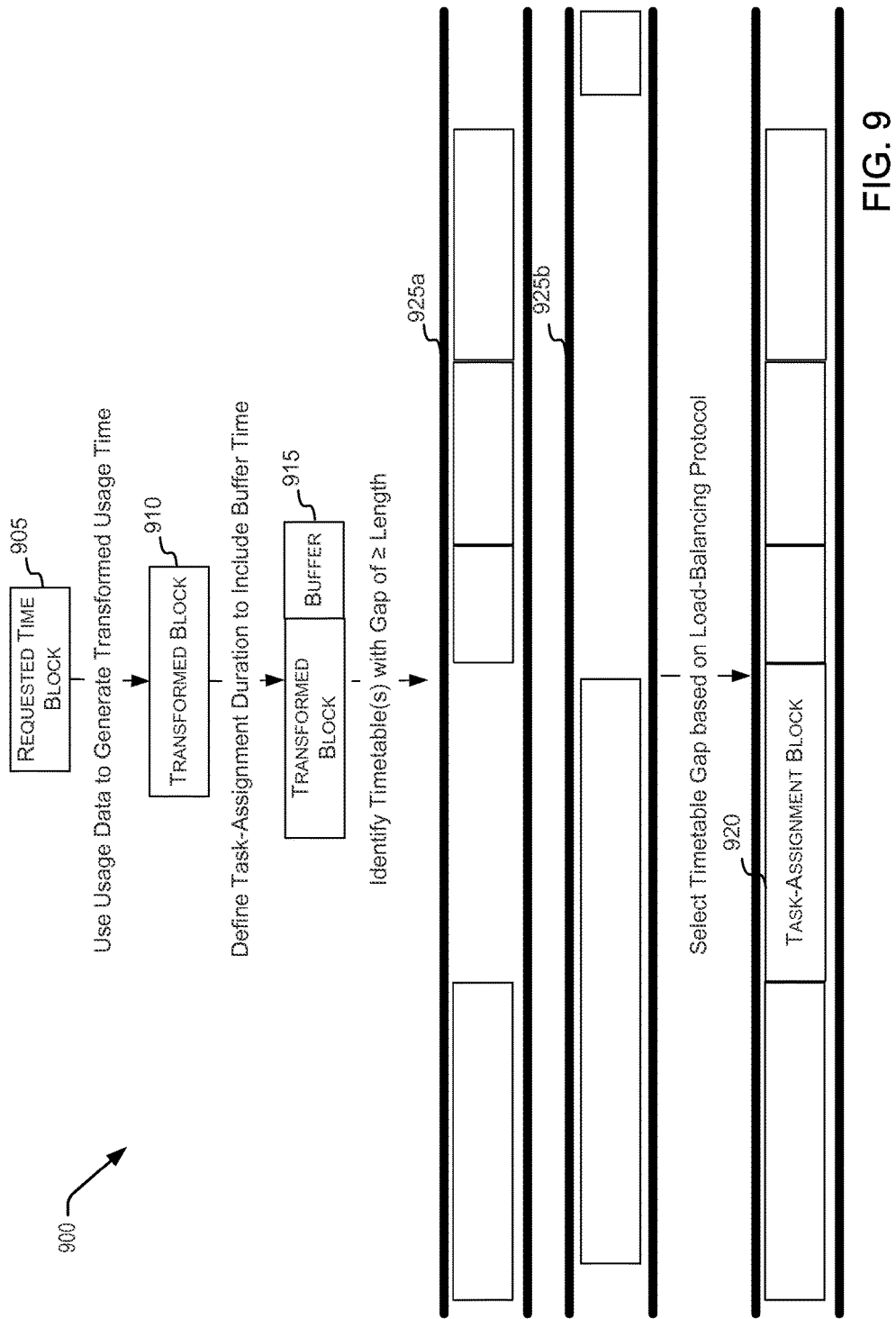
FIG. 9 shows an illustration of a transformation of a resource-usage time block according to an embodiment of the invention.

FIG. 9 shows an illustration of a transformation 900 of a resource-usage time block according to an embodiment of the invention. Transformation 900 may be performed, for example, by load balancing system 145, controlling device 136 and/or client device 105 (e.g., receiving usage and/or transformation data).

A requested time block 905 can be defined by a duration (e.g., in minutes or hours) and can be associated with a request for assignment of a resource (e.g., unit). Requested time block 905 may have a duration defined for completing a task associated with the request.

Requested time block 905 can then be transformed into a new requested time block, referred to as a transformed block 910. The transformation may be based on usage data that may be associated with request parameters, such as (for example) a client, resource, unit, facility, task type, geographical location, current time, and/or requested time associated with the request. The usage data may identify absolute or relative usage times associated with one or more request parameters. For example, the usage data may indicate that—at a particular facility and for a particular task type—90% of actual usages corresponded to durations between 75 and 90 minutes. As another example, the usage data may indicate that—for a particular client—the average extent to which actual usage times exceeded the requested usage times was 15%.

The usage data may be retrieved from a usage data store (e.g., usage data store 134), which may be local to or remote from a device performing the operation. In the latter instance, a communication may be transmitted from the transforming device to a device managing a usage data store that may include the one or more request parameters and a request to provide usage data corresponding to the request parameter(s).

The transformation can be unconditionally or conditionally performed. For conditional performance, a transformation may be conditioned upon (for example) detecting usage data that indicates that actual usage differed from (or exceeded) requested usage (e.g., at least a threshold percentage of the time and/or by an average amount that exceeds a defined threshold). To illustrate as an example, an average actual usage time and an average requested usage time may be identified for one or more request parameters, and a requested time block may be only transformed if the average actual usage time exceeds the average requested usage time by at least 5%. As another illustrative example, an average actual usage time may be identified for one or more request parameters, and if it is determined that a requested usage time (corresponding to requested time block 905) differs from the average actual usage time by 15 minutes or more, a transformation may be performed.

Transforming requested time block 905 may include, for example, adding time to the block, subtracting time from the block and/or multiplying or dividing a duration of block by a factor. An amount of time that is added or subtracted or a factor may be determined based on an analysis of usage data.

In some instances, one or more buffer time blocks 915 are identified. Each identified buffer time block may have a duration that is (for example) fixed, dependent on one or more request parameters (e.g., task type), dependent on a duration of the transformed block, dependent on a unit associated with a timetable, dependent on a facility associated with a timetable, and/or dependent on input (e.g., from a client or entity associated with a resource). In some instances, at least one buffer time block is associated with a time period for preparing a resource for usage during the time block, and/or at least one buffer time block is associated with a time period for at least partly restoring (e.g., cleaning) a resource after usage during the time block. In instances, where multiple buffer time blocks 910 are identified (e.g., to straddle a transformed block), they may, but need not, have a same duration.

A buffer time block 915 may have a duration that is determined in an absolute or relative sense. For example, a look-up table may indicate that a buffer time block is to be 30 minutes for a particular unit, or a buffer protocol may indicate that a buffer time block is to have a duration that is 10% of the transformed block.

One or more buffer time blocks 915 can be combined with transformed block 910 to produce a task-assignment time block 920. Task-assignment block 920 may be produced so as to have a duration that is equal to a sum of transformed block 910 and one or more buffer time blocks 915.

One or more timetables 925a, 925b may then be identified. Each of the identified timetables 925a, 925b may include at least one gap or opening of a duration at least as long as task-assignment block 920. It will be appreciated that, in some instances, a duration of task-assignment block 920 is dependent upon a resource, such that a minimum required opening duration may vary across timetables.

The timetable(s) 925a, 925b can include one(s) associated with or potentially associated with a request corresponding to requested time block 905. For example, in one instance, each of the timetable(s) can be associated with a resource, unit and/or facility identified in the request. As another example, each of the one or more timetables may be associated with a resource having characteristics that correspond to the request (e.g., have a particular specification or capability, are located within a defined distance from a client associated with the request and/or include a particular type of component). As yet another example, each (or at least one) of the one or more timetables may be associated with a past-assignment characteristics corresponding to the client (e.g., indicating that the client used a resource associated with the timetable at least once or a defined number of times).

The one or more timetables 925a, 925b may be identified by querying one or more resource timetable data stores 138, which may be local to or remote from a device performing transformation 900. The query may include one or more request parameters and/or selection-related parameters. For example, a load-balancing or selection protocol may indicate that timetable is to be selected that has an opening within the next five days, that stays on schedule at least 50% of the time and/or that is associated with an average response time (e.g., to confirm or reject an assignment) of less than an hour.

The one or more timetables 925a, 925b may then be evaluated based on a protocol (e.g., a load-balancing or selection protocol). The protocol may weight timetable-associated features such as how close (in terms of distance or time) an associated resource is to a client, whether a client has been assigned other time blocks in the timetable (or in another timetable associated with a same facility) generally or on a same day as the opening, how closely a time of the opening matches a duration of the task-assignment block (e.g., either favoring close matches or openings with extra time), and/or an extent to which a difference between a time of the opening and a duration The protocol may be (for example) pre-defined, generated based on input from the client and/or defined for a task type. The protocol may be at least partly defined based on machine learning, which may prioritize (for example) efficient scheduling of a resource (e.g., to avoid gaps in a final timetable or to reduce or minimize usage delays) and/or distributing assignments across resources.

In some instances, when a timetable gap is identified, an assignment is generated such that the gap or part of the gap is assigned to a client associated with the request. The assignment may be associated with the client, the request and/or one or more request parameters (e.g., a task type). Generating the assignment may include modifying the timetable to indicate that the resource is not available during the assigned time period.

In some instances, one or more communications are transmitted (e.g., to a client device associated with a request or to a controlling device associated with the timetable or with a resource associated with the timetable). The communication(s) may identify assignment details, such as (for example) a start time, a duration (e.g., of the transformed block or the task-assignment block), a task type, a resource identifier (e.g., an identifier of a unit and/or facility), a client, a location of a resource and/or other usage details. A communication may include an alert that an assignment has been generated and/or a request to approve the assignment. For example, a final assignment of a time block may be conditioned upon receiving a response communication from a client device and/or controlling device that indicates that the assignment is accepted. In various instances, the assignment time block may, but need not, be held for a period of time. Other response options may also be availed, such as an option that enables a client or resource-associated entity to identify an adjusted assignment detail (e.g., to indicate that an initial requested usage time is to be used instead of a new requested usage time determined based on a transformation).

At an assigned time, a resource may be availed to a client. For example, a component of the resource may be configured to detect an identifier of the client (e.g., a badge), a same component or different device may verify that the client is associated with an assignment at that time, and the resource may be unlocked for use by the client. As another example, a presentation may be generated at or around a time of the assignment on a controlling device or monitoring device that identifies the client.

Figure 10:
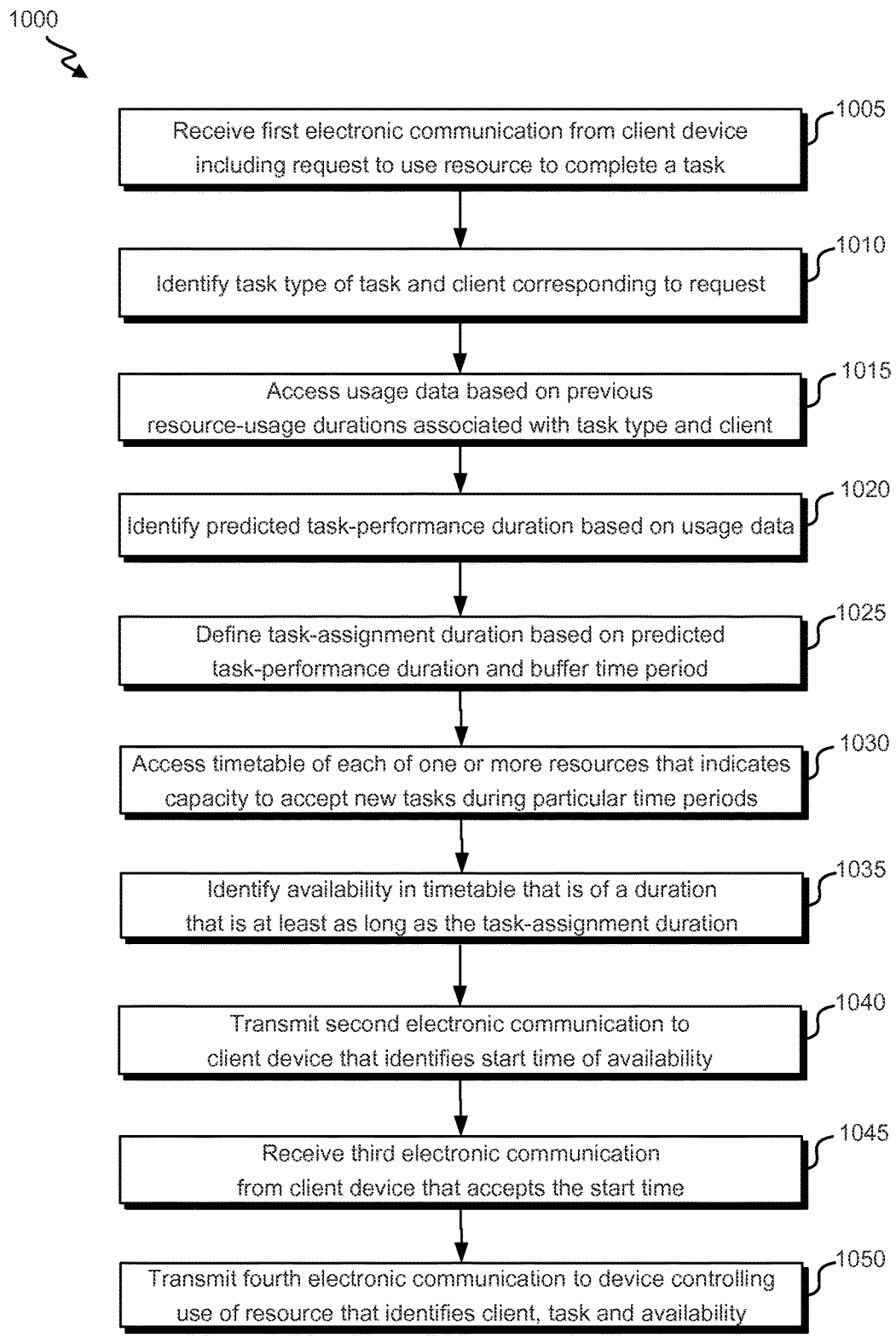
FIG. 10 shows a flowchart of a process for facilitating assignments of tasks to resources in particular time intervals based on usage patterns and resource capacities.

FIG. 10 shows a flowchart of a process 1000 for facilitating assignments of tasks to resources in particular time intervals based on usage patterns and resource capacities. Part or all of process 1000 may be performed, for example, by load balancing system 145 and/or controlling device 136. In some instances, client device 105 may perform part of process 1000.

Process 1000 begins at block 1005 where a first electronic communication is received from a client device. The first electronic communication includes a request to use a resource to complete a task. An indication that the request is to use a resource for completion of a task may be implicit or explicit (e.g., via specification of one or more task parameters, such as a task type). The first electronic communication may include a communication received via, for example, a webpage or app page. In some instances, the request may include one or more request parameters and/or a requested usage time.

At block 1010, a task type corresponding to the request and a client corresponding to the request are identified. In one instance, the task type and/or the client are included in content in or metadata of the first electronic communication. In one instance, the task type and/or the client are identified by looking up the task type and/or the client using data in or associated with the first electronic communication (e.g., an identifier of the client device or an identifier of the client).

At block 1015, usage data is accessed, the usage data being data related to or including previous resource-usage durations associated with the task type and the client. The usage data may include, for example, a duration of each of one or more previous usages of a resource by the client and/or for the task type and/or a processed version thereof (e.g., an average). The duration(s) may be absolute or relative (e.g., as compared to a requested usage time). The duration(s) may have been identified based on input data (e.g., detected at a monitoring device indicating that a usage has ended) and/or data detected by a resource-associated sensor (e.g., indicting when motion or a component RFID signal is no longer detected or when a client badge is detected leaving a resource). Usage data may be accessed, for example, by querying a local or remote data store (e.g., with an identifier of the client and/or task type) and/or by requesting the usage data from a remote device.

For example, block 1015 may include transmitting a request for usage data to multiple monitoring devices. The responsive data may include actual usage durations and corresponding requested usage may indicate that there have been a dozen unit assignments to the client within the past three months associated with the task type The responsive data may identify a usage duration and requested resource time for each of the unit assignments, such that it can be determined that (for example) all usage durations exceeded a requested usage duration, and that on average an actual usage duration exceeded a requested usage duration by 30 minutes.

At block 1020, a predicted task performance duration (e.g., new usage time) is identified based on the usage data. Block 1020 may include, for example, determining whether a predicted task performance duration is to be set to a requested usage time. Such a determination may be based on, for example, a percentage of past requests for which an actual usage time was less than or equal to (or within a defined absolute or relative time period from) a requested usage time. If the percentage was less than a defined threshold, the predicted task performance duration may be set to the requested usage time. Such a determination may be based on, for example, multiplying a requested usage time (e.g., as identified based on request-associated input or analysis of population usage data) by a factor identified based on an extent to which previous requested usage times differed from actual usage times (or adjusting requested usage times by adding or subtracting an absolute time amount based on usage data). Such a determination may be based on, for example, applying a model built on usage data (e.g., specific to the client or more generally applicable) that adjusts requested usage times based on request and/or resource parameters.

In one instance, a predicted task-performance duration is set to a requested usage duration unless one or more conditions are satisfied. The one or more conditions may include detecting that a threshold percentage of actual usage durations exceeded requested usage durations or that an average difference between actual usage durations and requested usage durations exceeded a threshold.

At block 1025, a task-assignment duration is defined based on the predicted task-performance duration and a buffer time period. The buffer time period may include a time period for preparing a resource and/or restoring a resource. The buffer time period may be (for example) fixed, dependent on one or more request parameters (e.g., task type), dependent on a duration of the transformed block, dependent on a unit associated with a timetable, dependent on a facility associated with a timetable, and/or dependent on input (e.g., from a client or entity associated with a resource). Thus, it will be appreciated that, in instances where a buffer time period depends on resource-related parameters, a task-assignment duration may vary across resources. The task-assignment duration may be, for example, defined to be equal to a sum or other combination of the predicted task performance duration and the buffer time period.

At block 1030, a timetable of each of one or more resources (e.g., units) is accessed. Block 1030 may include, for example, transmitting a request for a current timetable (e.g., generally or for a specified time period) to each of one or more controlling devices and receiving a response or querying a local data store. The one or more resources may include resources that comply with request parameters and/or with a resource-selection protocol (e.g., that are associated with a characteristic compliant with or corresponding to a request-associated feature, such as being associated with a resource located within a defined distance from the client device).

The timetable may be accessed via a query to a local or remote data store or via transmitting a request communication to one or more other devices (e.g., one or more other controlling devices). The timetable may indicate when a corresponding resource is available to be assigned, when a corresponding resource is available to be assigned to a particular client (e.g., indicating general availability and/or being held for the client) and/or when a corresponding resource has been assigned to another client and/or for another task.

At block 1035, one or more availabilities are identified in the one or more timetables. Each of the one or more availabilities have a duration that is at least as long as the task-assignment duration. Each of the one or more availabilities may include a general availability that may be assigned to any authorized client or a restricted availability that is being held for the client.

At block 1040, a second electronic communication is transmitted to the client device that identifies one or more specifications of each of at least one of the one or more availabilities. The one or more specifications may include (for example) a start time, duration, resource identifier, identifier of an associated facility, resource location, and/or resource specification.

In one instance, the second electronic communication identifies one or more specifications of each of the one or more availabilities. In one instance, the second electronic communication identifies one or more specifications of each of an incomplete subset of the one or more availabilities (e.g., if the one or more availabilities includes a plurality of availabilities). The incomplete subset may be selected using a selection protocol, such as one that uses a pseudo-random selection technique, that is biased towards one or more how soon the availability is, that is biased towards how geographically close the resource is to a location associated with the electronic request, that is biased towards resources associated with past assignments associated with the client, and so on.

The second electronic communication may be transmitted to the client device, for example, via a webpage, app page, SMS message, or email. The second electronic communication may include data to facilitate a presentation on the client device that identifies the one or more specifications of each of the at least one availabilities and/or that enables a client to provide input that accepts a given availability, rejects a given availability, and/or selects amongst multiple availabilities.

In one instance, the second electronic communication further includes the task-assignment duration and/or the predicted task-performance duration (e.g., which may differ from an original requested usage time identified by a client). The second electronic communication may include data to facilitate a (e.g., same or different) presentation that identifies the task-assignment duration and/or predicted task-performance duration and/or that enables a client to provide input that accepts, rejects or modifies one or more of the durations. For example, input may be provided to indicate that an initially identified resource usage duration is to be used instead of a predicted task-performance duration.

At block 1045, a third electronic communication is received from the client device that accepts an availability of the at least one or more availabilities. For example, the third electronic communication may be transmitted in response to a client selecting a representation of an availability on a webpage or app page or affirmatively responding to an email or SMS message that identifies an availability.

At block 1050, a fourth electronic communication is transmitted to a controlling device. The fourth electronic communication identifies the client, the availability and task information (e.g., type of task). The fourth electronic communication may be configured to facilitate a presentation on the controlling device that identifies the client, availability and task information and that enables an entity associated with the device to provide input that accepts, rejects or modifies an assignment of the task to the resource at a time associated with the availability.

If the assignment is accepted, a timetable of the resource may be modified to reflect the assignment (e.g., and to change an availability of the resource during the availability) and/or a communication may be transmitted to the client device to indicate that the task has been assigned to the availability time period.

Subsequently, a client device may directly communicate with a resource device (e.g., controlling device or monitoring device) to, for example, identify an extent to which a timetable is changed, provide additional task details, request component availability, and so on.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for facilitating assignments of tasks to resources in particular time intervals based on usage patterns and resource capacities, the system comprising:
one or more interfaces that:
receive a first set of electronic communications from one or more monitoring devices;
receive a second set of electronic communications from one or more resource-controlling devices;
transmit a third set of electronic communications to one or more resource-controlling devices;
receive a fourth set of electronic communications from one or more client devices; and
transmit a fifth set of electronic communications to one or more client devices;
a usage monitor that:
monitors the first set of electronic communications, received via the one or more interfaces, from the one or more monitoring devices to identify resource-usage durations; and
updates a usage-patterns data store to associate each of one or more entities and each of one or more task types with usage data based on one or more of the identified resource-usage durations;
a timetable mirror that:
monitors the second set of electronic communications, received via the one or more interfaces, from the one or more resource-controlling devices to identify updates to timetables of the resources that indicate capacities to accept new tasks during particular time periods; and
updates a mirrored timetable data store based on the identified updates to the timetables;
one or more load-balancing processors that:
detect a first electronic communication of the fourth set of electronic communications, received via the one or more interfaces from a client device of the one or more client devices, that corresponds to an electronic request to use a resource to complete a task, wherein the resource comprises medical equipment and/or laboratory equipment;
identify a task type of the task;
identify a client that corresponds to the electronic request;
access usage data, from the usage-patterns data store, associated with the client and the task type;
identify, based on the usage data, a task-performance duration that corresponds to the electronic request for using the resource;
define a task-assignment duration based on the task-performance duration and a buffer time period, wherein the buffer time period includes a time period for resource restoration;
access, for each of one or more resources and from the mirrored timetable data store, a timetable of the resource that indicates a capacity to accept new tasks during particular time periods;
identify an availability in the timetable of a resource of the one or more resources that is of a duration that is at least as long as the task-assignment duration;
generate a second electronic communication to be transmitted via the one or more interfaces to the client device that identifies a start time of the availability;
detect a third electronic communication received via the one or more interfaces from the client device that accepts the start time; and generate a fourth electronic communication to be transmitted via the one or more interfaces to a device controlling use of the resource that identifies the client, the task and the availability.

2. The system for facilitating assignments of tasks to resources in particular time intervals based on usage patterns and resource capacities as recited in claim 1, wherein:
the first electronic communication includes an initial task-performance duration, and wherein identifying the task-performance duration includes:
evaluating the initial task-performance duration based on the usage data and a modification condition; and
when it is determined that the modification condition is satisfied, identifying the task-performance duration, the task-performance duration being longer than the initial task-performance duration.

3. The system for facilitating assignments of tasks to resources in particular time intervals based on usage patterns and resource capacities as recited in claim 1, wherein the one or more resources includes a plurality of resources, and each resource of the plurality of resources is associated with a geographical location unique from amongst other resources in the plurality of resources.

4. The system for facilitating assignments of tasks to resources in particular time intervals based on usage patterns and resource capacities as recited in claim 1, wherein:
the second electronic communication includes the task-performance duration and enables the client device to identify a different task-performance duration to be used for assignment of the task.

5. The system for facilitating assignments of tasks to resources in particular time intervals based on usage patterns and resource capacities as recited in claim 1, wherein the one or more load-balancing processors further:
detect a fifth electronic communication from the device controlling use of the resource that indicates that an assignment of the task is accepted; and
generate a sixth electronic communication to be transmitted to the client device that is indicative of assignment of the task to the resource at the start time.

6. The system for facilitating assignments of tasks to resources in particular time intervals based on usage patterns and resource capacities as recited in claim 1, wherein:
at least some of the second set of electronic communications monitored by the usage monitor include sensor data from sensors associated with resources, and
the usage monitor updates the usage-patterns data store at least in part based on when an electronic communication indicates that a particular type of sensor data as defined in a condition was detected.

7. The system for facilitating assignments of tasks to resources in particular time intervals based on usage patterns and resource capacities as recited in claim 1, wherein the one or more load-balancing processors further:
detect a location associated with the first electronic communication;
identify a location of each of the one or more resources, the one or more resources including a plurality of resources; and
select at least one of the one or more resources based on the location of the resource relative to the location associated with the first electronic communication, the at least one of the one or more resources including the resource.

8. The system for facilitating assignments of tasks to resources in particular time intervals based on usage patterns and resource capacities as recited in claim 1, wherein:
the one or more resources includes a plurality of resources; and
the one or more load-balancing processors further evaluates the timetables of the plurality of resources based on a load-balancing protocol that prioritizes distributing assignments across resources.

9. The system for facilitating assignments of tasks to resources in particular time intervals based on usage patterns and resource capacities as recited in claim 1, wherein the usage data identifies a percentage of instances in which performance of a task of the task type and associated with the client exceeded a previously identified task-performance duration corresponding to the task.

10. A computer-implemented method for facilitating assignments of tasks to resources in particular time intervals based on usage patterns and resource capacities, the method comprising:
receiving a first electronic communication from a client device that corresponds to an electronic request to use a resource to complete a task, wherein the resource comprises medical equipment and/or laboratory equipment;
identifying a task type of the task;
identifying a client that corresponds to the electronic request;
accessing usage data based on previous resource-usage durations during which at least one resource was used to complete previous tasks of the task type, each of the previous tasks being associated with the client;
identifying, based on the usage data, a task-performance duration that corresponds to the electronic request for using the resource;
defining a task-assignment duration based on the task-performance duration and a buffer time period, wherein the buffer time period includes a time period for resource restoration;
accessing, for each of one or more resources, a timetable of the resource that indicates a capacity to accept new tasks during particular time periods;
identifying an availability in the timetable of a resource of the one or more resources that is of a duration that is at least as long as the task-assignment duration;
transmitting a second electronic communication to the client device that identifies a start time of the availability;
receiving a third electronic communication from the client device that accepts the start time; and
transmitting a fourth electronic communication to a device controlling use of the resource that identifies the client, the task and the availability.

11. The method for facilitating assignments of tasks to resources in particular time intervals based on usage patterns and resource capacities as recited in claim 10, wherein:
the first electronic communication includes an initial task-performance duration, and wherein identifying the task-performance duration includes:
evaluating the initial task-performance duration based on the usage data and a modification condition; and
when it is determined that the modification condition is satisfied, identifying the task-performance duration, the task-performance duration being longer than the initial task-performance duration.

12. The method for facilitating assignments of tasks to resources in particular time intervals based on usage patterns and resource capacities as recited in claim 10, wherein the one or more resources includes a plurality of resources, and each resource of the plurality of resources is associated with a geographical location unique from amongst other resources in the plurality of resources.

13. The method for facilitating assignments of tasks to resources in particular time intervals based on usage patterns and resource capacities as recited in claim 10, wherein:
the second electronic communication includes the task-performance duration and enables the client device to identify a different task-performance duration to be used for assignment of the task.

14. The method for facilitating assignments of tasks to resources in particular time intervals based on usage patterns and resource capacities as recited in claim 10, further comprising:
detecting a fifth electronic communication from the device controlling use of the resource that indicates that an assignment of the task is accepted; and
generating a sixth electronic communication to be transmitted to the client device that is indicative of assignment of the task to the resource at the start time.

15. The method for facilitating assignments of tasks to resources in particular time intervals based on usage patterns and resource capacities as recited in claim 10, further comprising:
monitoring a first set of electronic communications from one or more monitoring devices to identify resource-usage durations, wherein at least some of the first set of electronic communications monitored include sensor data from sensors associated with resources; and
updating a usage-patterns data store at least in part based on when one electronic communication of the first set of electronic communications indicates that a particular type of sensor data as defined in a condition was detected.

16. The method for facilitating assignments of tasks to resources in particular time intervals based on usage patterns and resource capacities as recited in claim 10, further comprising:
detecting a location associated with the first electronic communication;
identifying a location of each of the one or more resources, the one or more resources including a plurality of resources; and
selecting at least one of the one or more resources based on the location of the resource relative to the location associated with the first electronic communication, the at least one of the one or more resources including the resource.

17. The method for facilitating assignments of tasks to resources in particular time intervals based on usage patterns and resource capacities as recited in claim 10, wherein the one or more resources includes a plurality of resources, and the method further comprises:
evaluating the timetables of the plurality of resources based on a load-balancing protocol that prioritizes distributing assignments across resources.

18. The method for facilitating assignments of tasks to resources in particular time intervals based on usage patterns and resource capacities as recited in claim 10, wherein the usage data identifies a percentage of instances in which performance of a task of the task type and associated with the client exceeded a previously identified task-performance duration corresponding to the task.

* * * * *